United States Patent
Hakko et al.

(10) Patent No.: US 7,382,552 B2
(45) Date of Patent: *Jun. 3, 2008

(54) ZOOM OPTICAL SYSTEM

(75) Inventors: Manabu Hakko, Utsunomiya (JP);
Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/223,320

(22) Filed: Sep. 8, 2005

(65) Prior Publication Data

US 2006/0061875 A1 Mar. 23, 2006

(30) Foreign Application Priority Data

Sep. 8, 2004 (JP) .............................. 2004-261717

(51) Int. Cl.
*G02B 15/14* (2006.01)
(52) U.S. Cl. ...................................... 359/687; 359/679
(58) Field of Classification Search ................ 359/679, 359/687
See application file for complete search history.

(56) References Cited

U.S. PATENT DOCUMENTS

| | | | | |
|---|---|---|---|---|
| 5,825,560 A | | 10/1998 | Ogura et al. ................. | 359/822 |
| 5,847,887 A | | 12/1998 | Ogura et al. ................. | 359/822 |
| 5,963,376 A | * | 10/1999 | Togino ......................... | 359/676 |
| 6,021,004 A | | 2/2000 | Sekita et al. ................. | 359/676 |
| 6,166,866 A | | 12/2000 | Kimura et al. ............... | 359/729 |
| 6,292,309 B1 | | 9/2001 | Sekita et al. ................. | 359/729 |
| 6,366,411 B1 | | 4/2002 | Kimura et al. ............... | 359/729 |
| 6,522,475 B2 | | 2/2003 | Akiyama et al. ............ | 359/676 |
| 6,989,939 B2 | * | 1/2006 | Yamasaki et al. ........... | 359/683 |
| 7,079,324 B2 | * | 7/2006 | Yamasaki .................... | 359/680 |
| 2003/0103268 A1 | * | 6/2003 | Nishikawa et al. .......... | 359/676 |
| 2005/0036206 A1 | * | 2/2005 | Wada ........................... | 359/676 |
| 2005/0243436 A1 | * | 11/2005 | Yasui ........................... | 359/676 |
| 2006/0056051 A1 | * | 3/2006 | Hakko et al. ................ | 359/686 |

FOREIGN PATENT DOCUMENTS

| | | |
|---|---|---|
| JP | 08-292371 | 11/1996 |
| JP | 08-292372 | 11/1996 |
| JP | 09-005650 | 1/1997 |
| JP | 09-222561 | 8/1997 |
| JP | 2002-055279 | 2/2002 |
| JP | 2002-207167 | 7/2002 |

* cited by examiner

*Primary Examiner*—Jordan M Schwartz
(74) *Attorney, Agent, or Firm*—Morgan & Finnegan, LLP

(57) ABSTRACT

A zoom optical system includes in order from a reduction side to a magnification side: a first lens unit having a positive optical power; a second lens unit having a negative optical power; a third lens unit having a positive optical power; and a fourth lens unit having a positive optical power, wherein respective intervals between the above described first, second, third and fourth lens units vary during zooming; a magnification-side conjugate position with respect to a reduction-side conjugate position and a position of a pupil of the above described zoom optical system with respect to a reduction-side conjugate position are substantially immobile respectively across the entire zooming range, and the above described fourth lens unit moves toward the magnification side and an interval between the above described first lens unit and the above described fourth lens unit increases during zooming from a wide-angle end to a telephoto end.

18 Claims, 14 Drawing Sheets

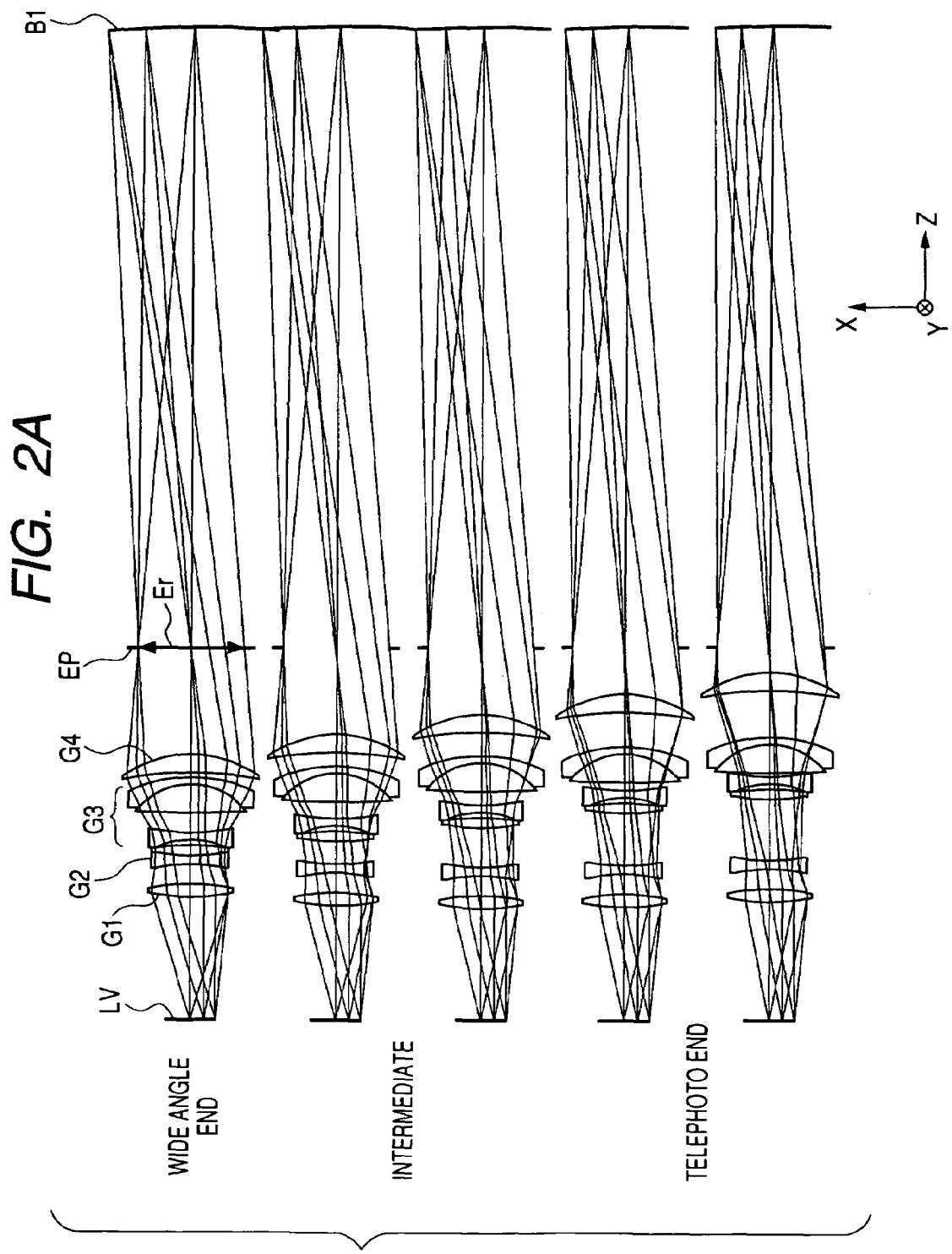

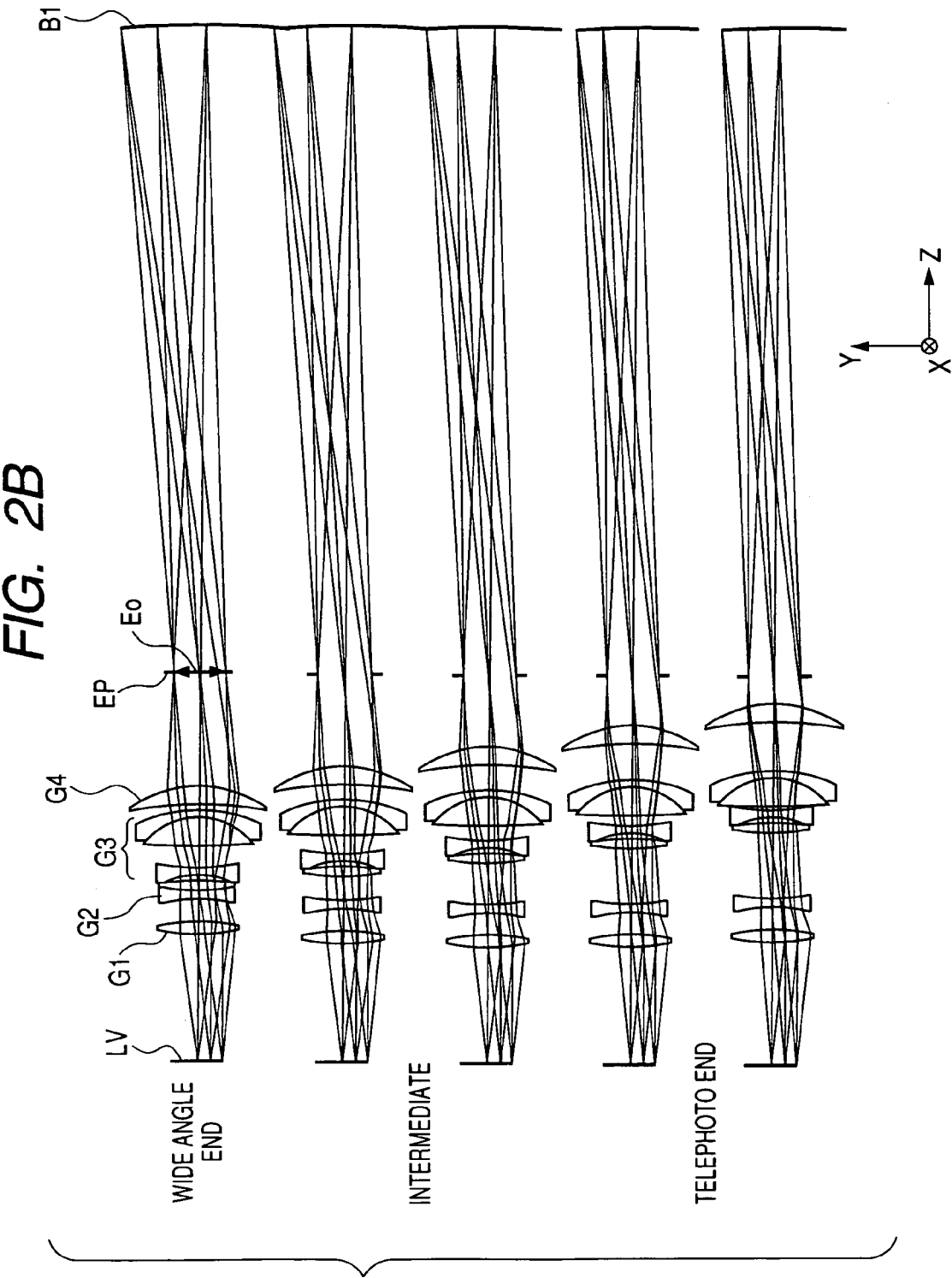

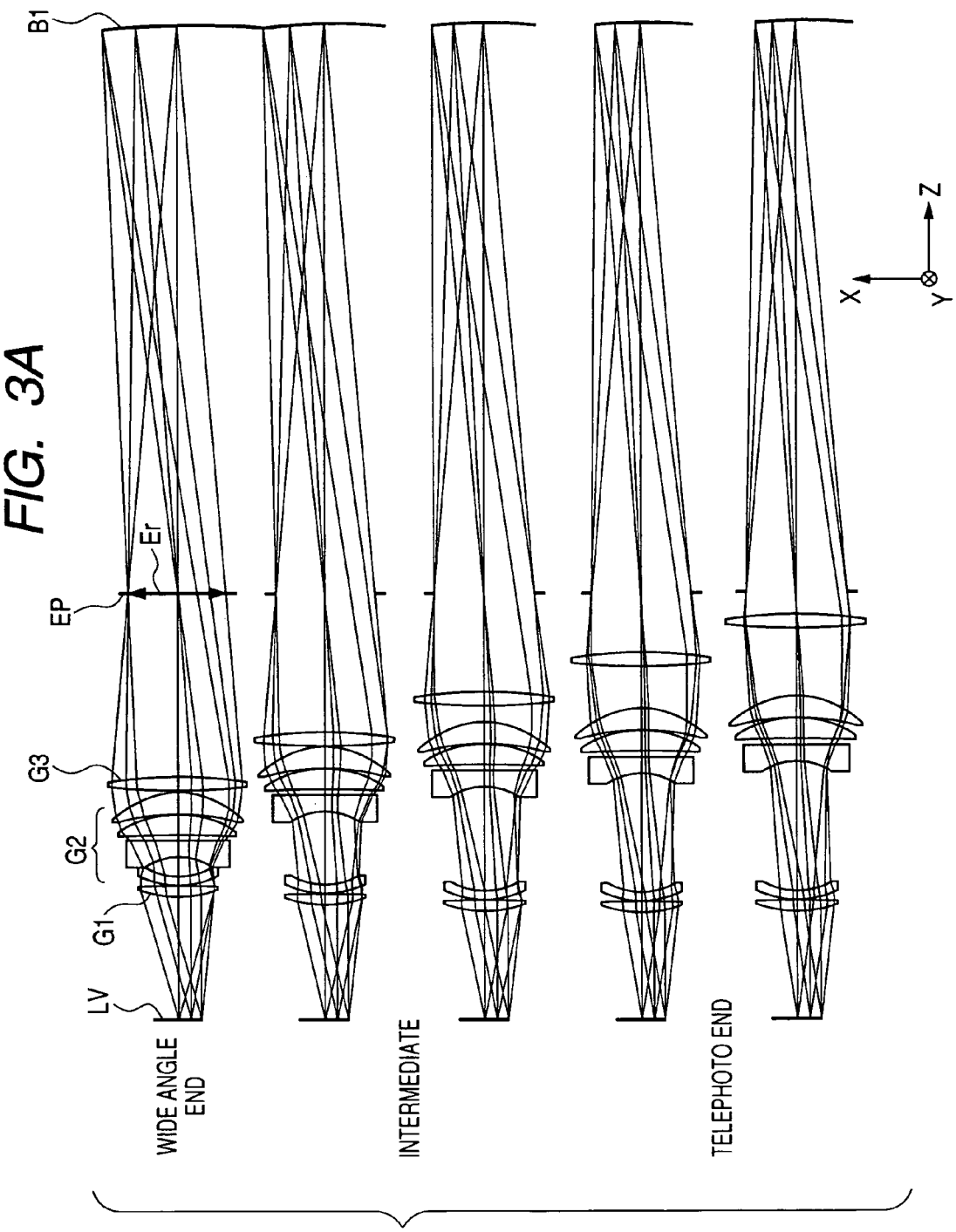

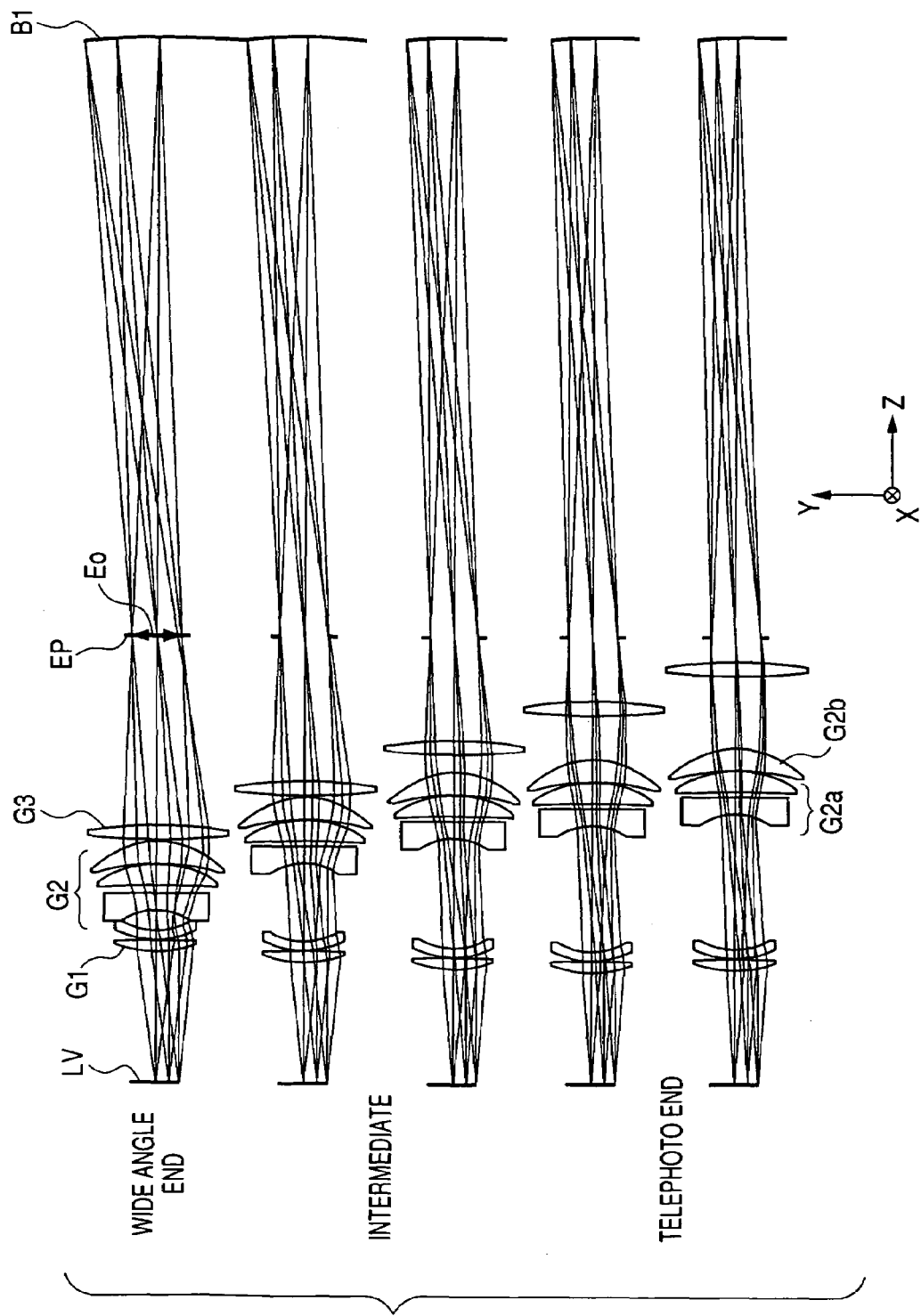

| | p1 | p2 | p3 | p4 |
|---|---|---|---|---|
| EMBODIMENT 1 | 0.0115721 | -0.02 | 0.00956462 | 0.0145595 |
| EMBODIMENT 2 | 0.0108031 | -0.016814 | 0.00942778 | 0.00730991 |
| CONSTITUENTS OF 4 LENS UNITS OF EMBODIMENT 2 | 1ST TO 4TH SURFACES | 5TH TO 8TH SURFACES | 9TH TO 10TH SURFACES | 11TH TO 12TH SURFACES |

ZOOM OPTICAL SYSTEM

BACKGROUND OF THE INVENTION

1. Field of the Invention

The present invention relates to a zoom optical system used for an optical apparatus such as an image projecting apparatus, an exposure apparatus and the like.

2. Related Background Art

Some optical apparatuses as described above need a zoom optical system that is excellent in the telecentricity on the object side and excellent in invariance of positions of the object surface, the image plane and the exit pupil to a variation of the focal length.

For example, Japanese Patent Application Laid-Open No. 2002-207167 has disclosed a zoom optical system suitable for illumination optical system installed in a projection exposure apparatus, that moves a lens unit having negative refractive power or a lens unit including a lens element having a strong negative refractive power toward an object side as focal length gets shorter so as to make positions of an object surface, an image plane, an entrance pupil and an exit pupil immobile against variation of focal length.

In addition, in Japanese Patent Application Laid-Open No. 2002-055279, a zoom optical system suitable for a transmission optical system in illumination optical system installed in a projection exposure apparatus has been disclosed. The zoom optical system includes at least four lens units and at least three lens units moves so as to change the refractive power arrangement from negative-positive-positive or positive-positive-negative in the order from the object side to a positive-negative-positive in the order from the object side during zooming from the wide angle end to the telephoto end and thereby positions of an object surface, an image plane, an entrance pupil and an exit pupil are made immobile against variation of focal length.

Here, it is considered to use a zoom optical system disclosed in Japanese Patent Application Laid-Open No. 2002-207167 and Japanese Patent Application Laid-Open No. 2002-055279 in projection optical system or a part thereof of an image projecting apparatus of magnifying/projecting an image of an original formed on a liquid crystal panel.

However, if liquid crystal panel is disposed on a reduction side focal plane of a zoom optical system disclosed in Japanese Patent Application Laid-Open No. 2002-207167, it is impossible to secure a sufficient back focus and space for arranging a color synthesizing member at the reduction side. For a so-called 3-plate type image projecting apparatus, a color synthesizing member for synthesizing three color lights of red, green and blue is arranged on the reduction side of a zoom optical system. However, if there is no sufficient back focus as described above, it will become impossible to secure a space for arranging the color synthesizing member.

In addition, in the zoom optical system disclosed in Japanese Patent Application Laid-Open No. 2002-207167, a lens unit at the most reduction side has a negative refractive power, and as focal length gets shorter, a lens unit having a positive refractive power arranged on the magnification side of the negative lens unit (a second lens unit) moved toward the magnification side so that an interval between the both lens units increases. Therefore, the effective diameter of the positive lens unit will get large. Moreover, since the lens unit at the most reduction side has a negative refractive power, a numerical aperture (NA) on the reduction side will get small.

Here, in Japanese Patent Application Laid-Open No. 2002-207167, such a case where a lens unit at the most reduction side is caused to have a positive refractive power is disclosed. However, since this lens unit significantly moves toward the magnification side as the focal length gets shorter, the effective diameter of the lens unit will get large if the NA on the reduction side is made large.

That is, in this zoom optical system, in a state of the minimum focal length (wide), a plurality of lens units get closer toward an aperture stop side, and as the focal length gets longer, move toward the reduction side focal plane side, and therefore the effective diameter of the lens unit is apt to get large, which is not appropriate for deriving compactness. Moreover, that is not appropriate either for securing a sufficient back focus since a lens unit on the most magnification side has a positive refractive power. Furthermore, the zoom optical system assumes a light source with single wavelength, and is inappropriate for a projection display of a color image.

In addition, in the zoom optical system disclosed in Japanese Patent Application Laid-Open No. 2002-055279, a synthesized refractive power of the adjacent lens units get occasionally negative, that is, the refractive power is weak. Accordingly, the focal length is large as long as 190 mm at minimum. This takes place since the zoom optical system is an optical system intended to be appropriate for an exposure apparatus, and this system is not suitable for an optical system such as a projector etc. that is desired to derive compactness and a wide angle. In addition, likewise the zoom optical system disclosed in Japanese Patent Application Laid-Open No. 2002-207167, this zoom optical system assumes a light source with a single wavelength, and therefore is inappropriate for a projecting display of a color image.

SUMMARY OF THE INVENTION

According to one aspect of the invention, a zoom optical system includes, in order from a reduction side to a magnification side: a first lens unit having a positive optical power; a second lens unit having a negative optical power; a third lens unit having a positive optical power; and a fourth lens unit having a positive optical power, wherein respective intervals between the first, second, third and fourth lens units vary during zooming, a magnification-side conjugate position with respect to a reduction-side conjugate position and a position of a pupil of the zoom optical system with respect to the reduction-side conjugate position are substantially immobile respectively across an entire zooming range, and the fourth lens unit moves toward the magnification side and an interval between the first lens unit and the fourth lens unit increases during zooming from a wide-angle end to a telephoto end.

According to another aspect of the invention, a projecting optical system includes: a zoom optical system set out in the foregoing, wherein a light beam from an original arranged in said reduction conjugate position is projected onto a surface to be projected.

According to another aspect of the invention, a projecting optical system includes: a zoom optical system set out in the foregoing; a reflecting member, substantially arranged in said pupil position, for reflecting light beam from the zoom optical system; and a reflecting optical system including a plurality of reflecting surfaces for sequentially reflecting light beam from said reflecting member, wherein a light beam, which is from an original arranged in said reduction conjugate position and is incident to said zoom optical system, is projected onto a surface to be projected by said reflecting optical system, and wherein said reflecting member rotates so that a projected image projected onto said surface to be projected moves on said surface to be projected.

According to another aspect of the invention, an image projecting apparatus includes: a projecting optical system set out in the foregoing and an image forming element of forming said original.

According to another aspect of the invention, an image projecting system includes: the image projecting apparatus set out in the foregoing and an image information providing apparatus for supplying said image projection apparatus with image information for forming said original.

According to another aspect of the invention, a zoom optical system includes in order from a reduction side to a magnification side: a first lens unit having a positive optical power; a second lens unit having a negative optical power; and a third lens unit having a positive optical power, wherein respective intervals between said first, second and third lens units vary during zooming, a magnification-side conjugate position with respect to a reduction-side conjugate position and a position of a pupil of said zoom optical system with respect to a reduction-side conjugate position are substantially immobile respectively across a entire zooming range, said third lens unit approaches a pupil and an interval between said first lens unit and said third lens unit increases during zooming from a wide-angle end to a telephoto end, and said second lens unit is configured, in order from said reduction side to a magnification side, by a 2a-th lens sub unit having a negative optical power and a 2b-th lens sub unit having a positive optical power.

According to another aspect of the invention, a projecting optical system includes: a zoom optical system set out in the foregoing, wherein a light beam from an original arranged in said reduction conjugate position is projected onto a surface to be projected.

According to another aspect of the invention, a projecting optical system includes: a zoom optical system set out in the foregoing; a reflecting member, substantially arranged in said pupil position, for reflecting light from the zoom optical system; and a reflecting optical system including a plurality of reflecting surfaces for sequentially reflecting light from said reflecting member, wherein a light beam, which is from an original arranged in said reduction conjugate position and is incident to said zoom optical system, is projected onto a surface to be projected by said reflecting optical system, and said reflecting member rotates so that a projected image projected onto said surface to be projected moves on said surface to be projected.

According to another aspect of the invention, an image projecting apparatus includes: a projecting optical system set out in the foregoing and an image forming element of forming said original.

According to another aspect of the invention, an image projecting system includes: the image projecting apparatus set out in the foregoing and an image information providing apparatus for supplying said image projection apparatus with image information for forming said original.

BRIEF DESCRIPTION OF THE DRAWINGS

FIG. 2A is a sectional diagram of a zoom optical system being Embodiment 1 of the present invention;

FIG. 2B is a sectional diagram of a zoom optical system of Embodiment 1;

FIG. 3A is a sectional diagram of a zoom optical system being Embodiment 2 of the present invention;

FIG. 3B is a sectional diagram of a zoom optical system of Embodiment 2;

DESCRIPTION OF THE PREFERRED EMBODIMENTS

An object of the present embodiment is to provide a zoom optical system that is not only excellent in telecentricity at the object side and excellent in invariance of positions of the object surface, the image plane and the exit pupil to a variation of the focal length but also is compact and bright and can secure a back focus sufficiently.

Here at first, characteristics of a zoom optical system of the present embodiment will be described.

One of zoom optical systems of the present embodiment has a plurality of zoom lens units, that move integrally respectively including, in order from the reduction side to the magnification side, a first lens unit having a positive optical power, a second lens unit having a negative optical power, a third lens unit having a positive optical power and a fourth lens unit having a positive optical power. In addition, another zoom optical system of the present embodiment has a plurality of zoom lens units that move integrally respectively including, in order from the reduction side to the magnification side, a first lens unit having a positive optical power, a second lens unit having a negative optical power and a third lens unit having a positive optical power. Of course, other optical elements may be included complementarily. For example, an element selected from the group consisting of a polarizing plate, a wavelength plate, a lens with a weak optical power (refractive power) (that is, a focal length of a wide angle end or a focal length twice longer than that), a diffraction grating, mirror and the like, that might be added to a zoom optical system of the present invention, derives substantially the same zoom optical system of the present invention.

And, respective lens units are moved so that intervals between respective lens units vary during zooming, and positions of conjugate points on a magnification side as well as a reduction side and a pupil between those conjugate points get substantially immobile across the entire zooming range. Moreover, during zooming from the wide angle end to the telephoto end, a lens unit on the most magnification side (the fourth lens unit or the third lens unit) among the magnification lens units approaches a pupil on the magnification side and an interval between the first lens unit and the lens unit at the most magnification side increases.

Figure 1:
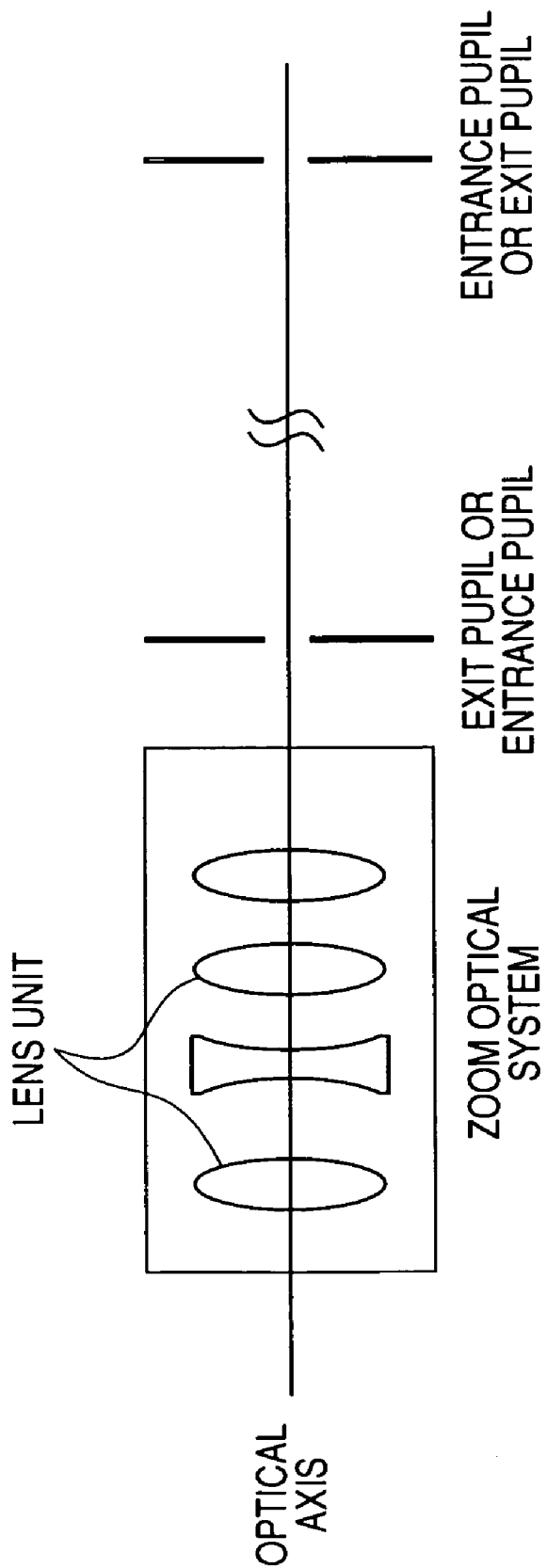
FIG. 1 is a schematic diagram showing a configuration of a zoom optical system being an embodiment of the present invention.

Here, in the present invention, the above described pupil is located outside the zoom optical system. FIG. 1 shows a relationship between a position of a zoom optical system and a position of an entrance pupil as well as an exit pupil of the zoom optical system. Both of the pupils are not present between (inside the range from) the first plane and the last plane and are located outside.

A first feature is that the first lens unit on the most reduction side is caused to have a positive refractive power (optical power, that is, an inverse of the focal length) in order to keep the entire zoom optical system compact, secure a sufficient back focus and derive a bright optical system. Thereby, while restraining the effective diameter of the lens unit arranged on the magnification side of the first lens unit, the NA (numerical aperture) at the object side can be made large.

In the case where the refractive power of the first lens unit is negative, the effective diameters of the second lens unit and thereafter are apt to get large. Even if the second lens unit is caused to have a positive refractive power, the effective diameter will end in undergoing magnification as well if an interval between the first lens unit and the second lens unit is widened at last when varying focal length, consequently being followed by size increase of the zoom optical system in its entirety.

A second feature is that, at the time of varying the focal length of a zoom optical system from a short side to a long side, that is, during zooming from a wide end (wide angle end) to a telephoto end (telephoto end), an interval of the lens unit (first lens unit) located at the most reduction side and the lens unit (fourth lens unit or third lens unit) located at the most magnification side is widened. In case of making the pupil diameter constant to variation of focal length, the NA at the reduction side is maximum with the minimum focal length (wide angle end) and get smaller as the focal length gets longer. Therefore, at the wide angle end, the lens unit located at the most magnification side is caused to be located at the most reduction side within its mobile range, and be caused to move toward the magnification side as the focal length gets longer. Thereby, without making the effective diameter large, high magnification will be-able to be derived.

A third feature is that in order to keep, across the entire zooming range, the position of the object surface (reduction-side conjugate point), the image plane (magnification-side conjugate point) and the pupil position substantially constant (immobile) and correct the aberration well, the lens unit arranged between the lens unit located at the most reduction side and the lens unit located at the most magnification side is also made mobile.

Here, when increasing the number of movable lens units, the aberration can be corrected better, but the present invention will not limit the number of mobile lens units. Moreover, addition of a focus lens unit that does not substantially attribute to zooming increases the number of mobile lens units, and this case is also included in the scope of the present invention.

A fourth feature is that the position, at the telephoto end, of the lens unit located at the most reduction side is closer to the reduction-side conjugate plane (conjugate point) than the position, at the wide angle end, of the lens unit located at the most reduction side is, and the position, at the telephoto end, of the lens unit located at the most magnification side is closer to the magnification-side conjugate plane than the position, at the wide angle end, of the lens unit located at the most magnification side is. Thereby, high magnification in spite of compactness is derived.

Figure 14:
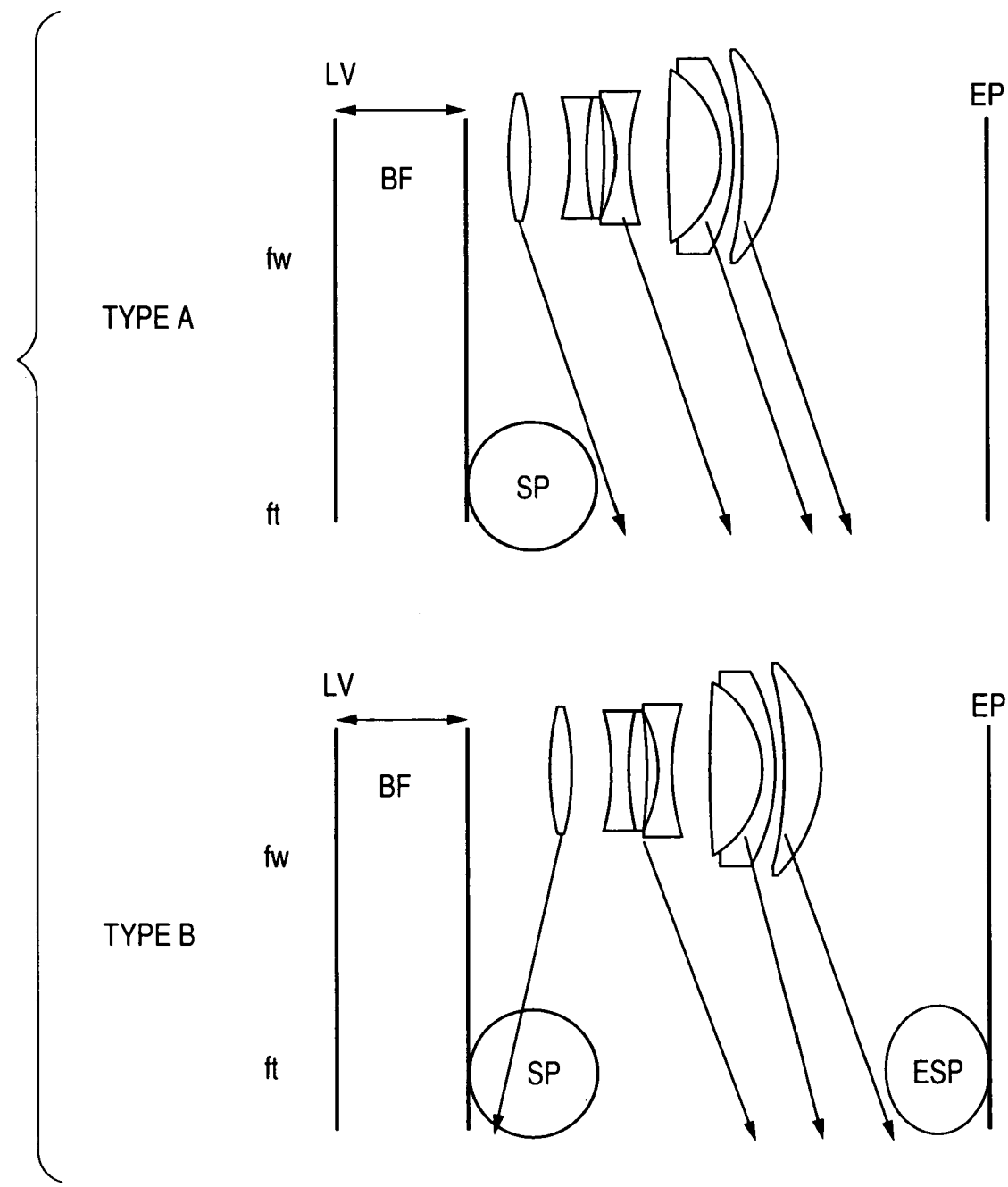
FIG. 14 is a drawing of comparing a prior art and the present embodiment in loci of movements of respective lens units during zooming from a wide angle end to a telephoto end.

In case of taking the reduction-side conjugate plane as the object surface, the magnification-side conjugate plane becomes the image plane, the reduction side pupil becomes the entrance pupil and the magnification side pupil becomes the exit pupil. FIG. 14 schematically shows that, during zooming from the wide angle end to the telephoto end, the movable lens units move along different loci. Reference character LV denotes an object surface where a light bulb (liquid crystal display panel) is disposed in an image projecting apparatus described later. Reference characters G1 to G4 denote a first to a fourth lens unit, reference character BF denotes a back focus, reference character EP denotes an exit pupil, reference character SP denotes a space at an object side, reference character ESP denotes a space at an exit pupil side, reference character fw denotes a focal length at a wide angle end and reference character ft denotes a focal length at a telephoto end.

As in Type A where the first lens unit G1 at the most object side moves toward the image side (exit pupil side) as the focal length gets longer, an advantageous use of the space SP on the object side will not be feasible during zooming implemented by enlarging an interval between the first lens unit G1 and the third lens unit G3, and in order to derive high magnification, the total length of the zoom optical system will get long.

In contrast, in zooming in case of Type B corresponding to the present embodiment, as the focal length gets long, the first lens unit G1 approaches the object surface and moreover the third lens unit G3 moves in the opposite direction of the first lens unit G1. Thereby, the space SP is utilized effectively to enable an interval between the first lens unit G1 and the third lens unit G3 to be widened more easily than in Type A and to enable the zoom optical system to get compacter than in Type A in case of deriving the same magnification. Moreover, in Embodiment 1 to be described later, the fourth lens unit G4 moves so as to sufficiently secure the space ESP where a rotational mirror (RM in FIG. 5) is arranged. In addition, in case of Embodiment 2, with the space ESP having been secured, the third lens unit G3 moves in the opposite direction of the first lens unit G1.

A fifth feature is that the optical system is substantially telecentric on the object side and a plurality of lens units are moved along the respective loci determined so that, across entire zooming range, distance from image side principal point to the exit pupil of the zoom optical system becomes substantially equal to the focal length of the zoom optical system.

In addition, in this relation, a seventh feature is that a plurality of lens units are caused to move along the respective loci determined so that the interval between the object side principal point of the zoom optical system and the image side principal point becomes substantially equal to $$E-fz-fz(x'+fz)/x' \qquad (1)$$

where E represents the distance from the object surface to the exit pupil surface located between the object surface and the image plane of the zoom optical system, x' represents the distance from the exit pupil surface to the image plane and fz represents the focal length of the zoom optical system. Here, the description "become/be substantially equal to" is adopted, and this description means that discrepancy up to 5% (preferably 3% and more preferably 1%) from the value of the above described conditional Expression (1) is tolerant.

Figure 4:
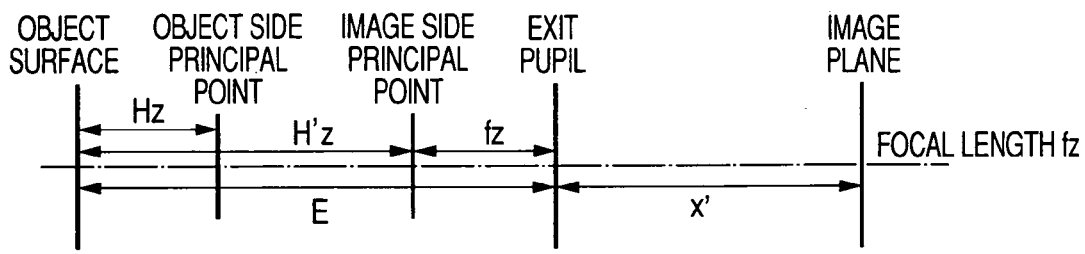
FIG. 4 shows a paraxial relationship of a zoom optical system of the present invention.

Here, FIG. 4 shows a paraxial relationship of a zoom optical system of the present embodiment. In case of taking the reduction-side conjugate plane as the object surface, in a state of the object side being telecentric, the exit pupil is derived in the position apart from the image side principal point at a distance equivalent to the focal length fz of the zoom optical system. That is, as concerns arrangements of lens units in the zoom optical system of the present embodiment and the loci of movement thereof, across the entire zooming range, the image side principal point is set to be located to the object side at a distance of only the focal length fz in that magnification state apart from a predetermined exit pupil position (fifth feature).

Figure 9:
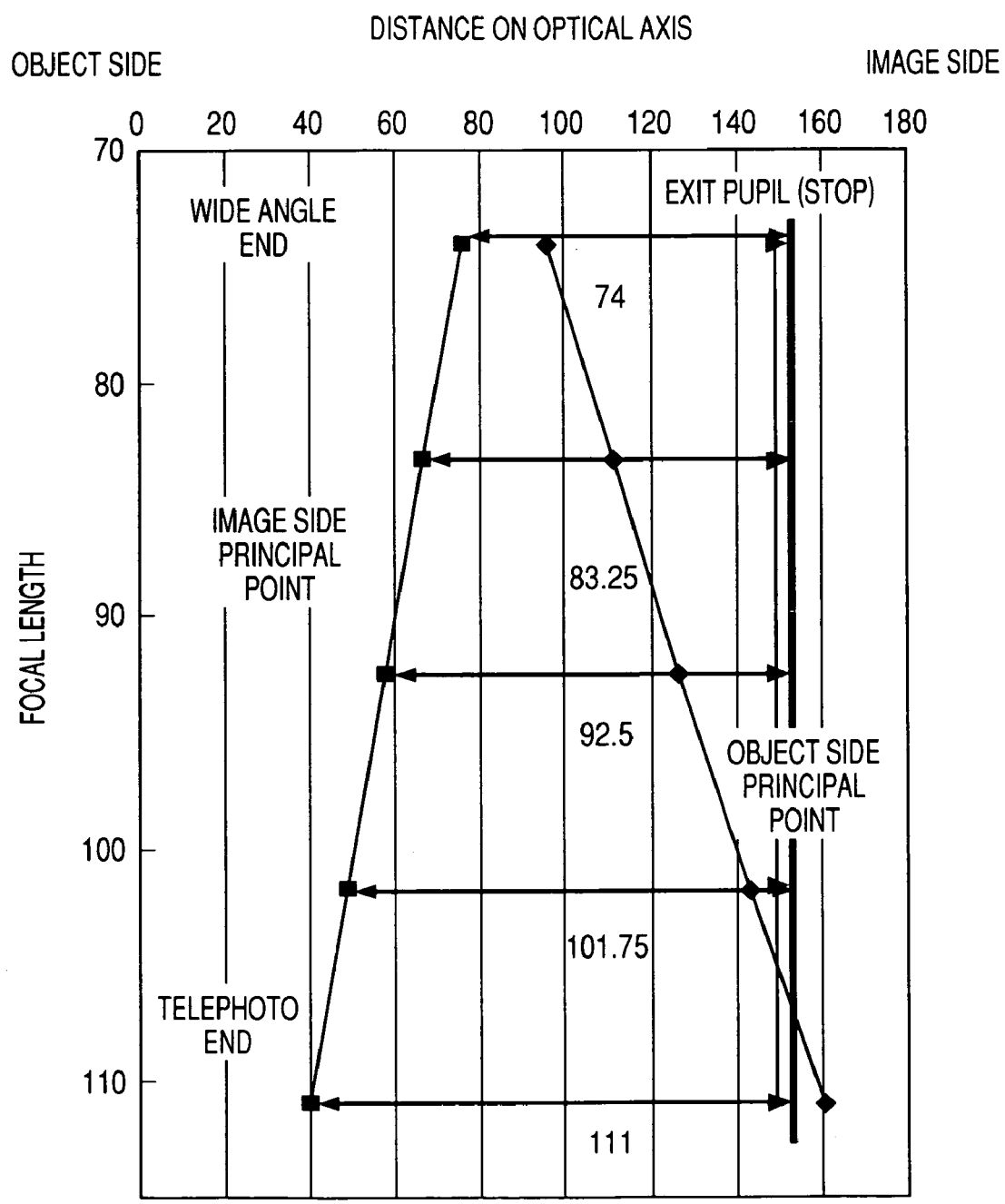
FIG. 9 is a graph showing relationships of positions of an object side principal point, an image side principal point and an exit pupil of Numerical Embodiment 1.
Figure 11:
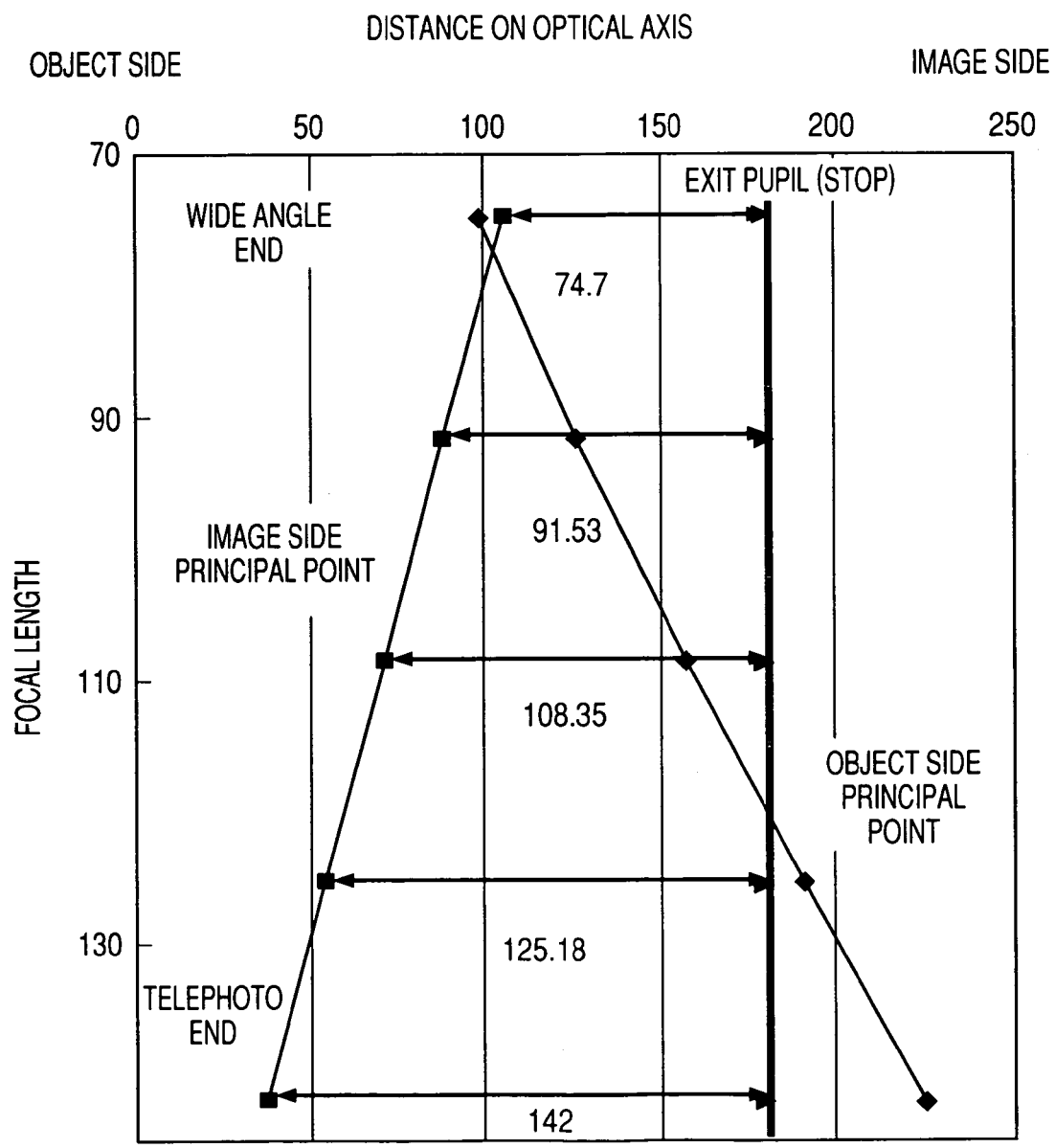
FIG. 11 is a graph showing relationships of positions of an object side principal point, an image side principal point and an exit pupil of Numerical Embodiment 2.

Respectively for Embodiment 1 and Embodiment 2, FIG. 9 and FIG. 11 show distance from the image side principal point to the exit pupil. From these drawings, it is apparent that distance from the image side principal point to the exit pupil is substantially equal to the focal length of the zoom optical system.

In addition, the image side principal point is set so as to derive a predetermined magnification, in addition to relationship with the exit pupil position, in a state that the object surface and the image plane are in predetermined positions during zooming.

That is, ideally, if the lens units are arranged so that the image side principal point is located to the object side at only distance apart equivalent to the focal length fz from the exit pupil position, and moreover an interval between the object side principal point and the image side principal point (H'z-Hz) is substantially equal to the value of the above described expression (1), in a telecentric optical system, positions of the object surface, the image plane, the entrance pupil (infinity) and the exit pupil can be made constant (immobile) during zooming (sixth feature).

Figure 10:
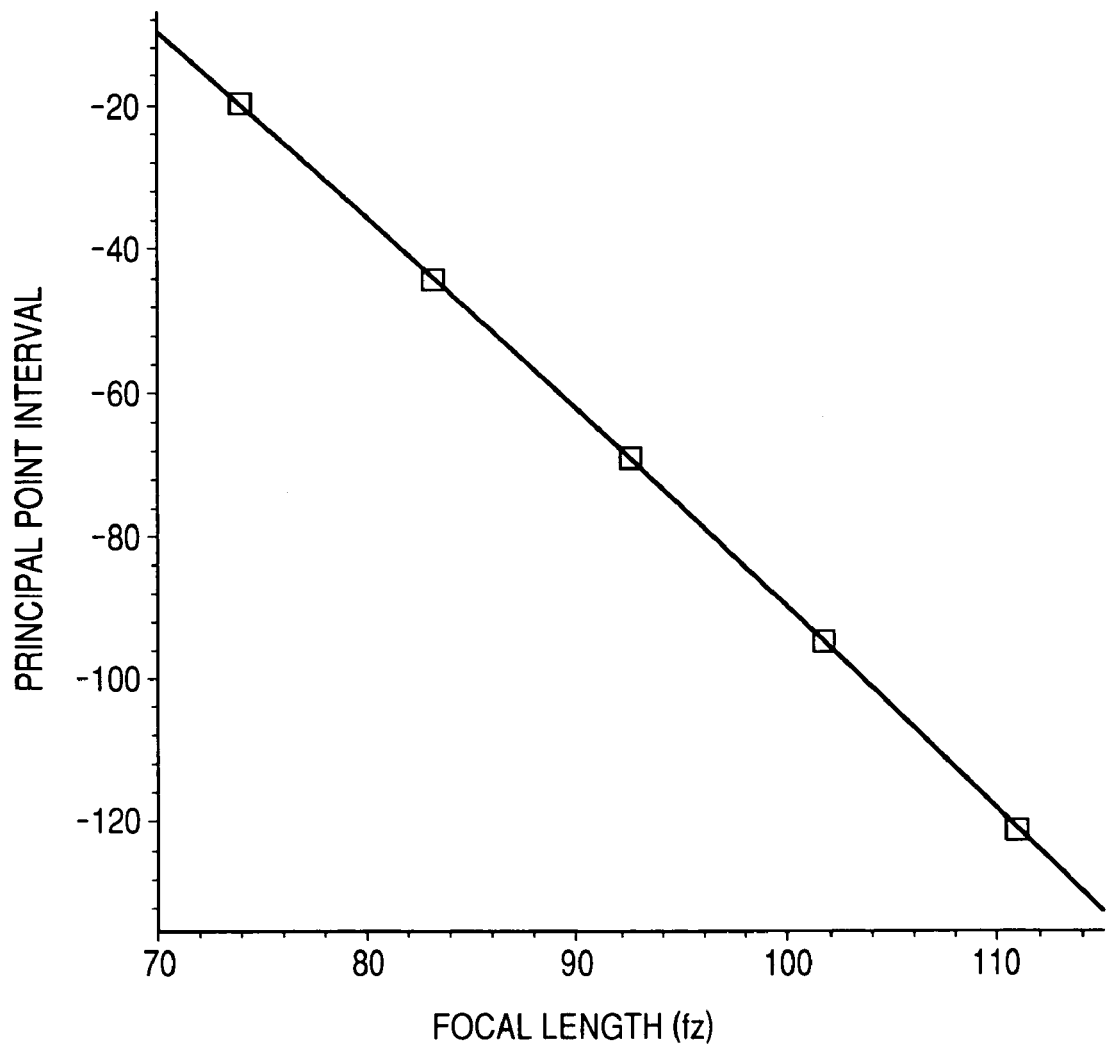
FIG. 10 is a graph showing theoretical values and actual values of the principal point intervals of Numerical Embodiment 1.
Figures 12, 13:
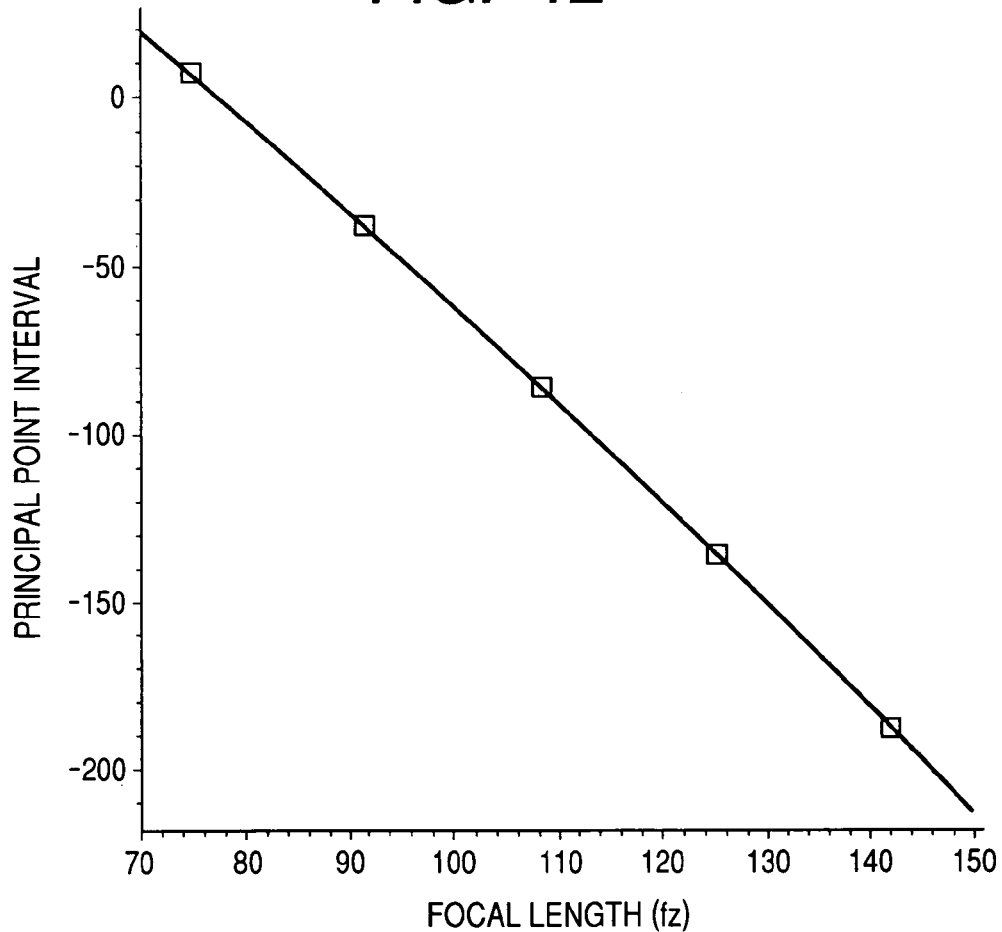
FIG. 12 is a graph showing theoretical values and actual values of the principal point intervals of Numerical Embodiment 2.
FIG. 13 is a table showing refractive powers of respective units of Numerical Embodiments 1 and 2.

Respectively for Embodiment 1 and Embodiment 2, in FIG. 10 and FIG. 12, theoretical values of the Expression (1) is indicated with a solid line and the actual principal point interval with each focal length derived by dividing the range of the focal length equally by five is plotted with void marks. From these drawings, it is apparent that the interval between the object side principal point and the image side principal point is substantially equivalent to the values of the Expression (1).

A seventh feature is that, across the entire zooming range, distance from an object surface to the first lens unit (back focus) is three times or more larger than the maximum object height. In a 3-plate type image projecting apparatus to be described later, in order to arrange color synthesizing member for synthesizing three color lights of red, green and blue on the reduction side of the zoom optical system, with the back focus being 3 times or more larger than the maximum object height (that refers to the distance from the point at the distance from optical axis being farthest among effective areas of image forming apparatus such as a crystal display panel etc. arranged in the reduction-side conjugate position to the optical axis.), the space (SP in FIG. 14) where the color synthesizing member is arranged can be secured.

An eighth feature is that, across the entire zooming range, the interval between the pupil on the magnification side and the lens unit located at the most magnification side of the zoom optical system is longer than a half of the minimum diameter of the pupil on the magnification side (multiplied by preferably 1 and more preferably by 2).

FIGS. 2B and 3B are sectional diagrams showing Embodiments 1 and 2 including the minimum diameter of the pupil on the magnification side. As apparent from these drawings, across the entire zooming range between the telephoto end and the wide angle end, an interval between the pupil on the magnification side and the lens unit located at the most magnification side (the fourth lens unit G4 in Embodiment 1 and the third lens unit G3 in Embodiment 2), that is, the space ESP shown in FIG. 14, is secured wider than the minimum diameter (of course wider than a half of the minimum diameter) of the pupil on the magnification side.

Thereby, for example, as embodiments to be described later, in case of arranging a rotatable mirror (RM in FIG. 4) in the position of the exit pupil, interference between the mirror and the lens unit located at the most magnification side can be avoided. Here, actually, since a drive mechanism of the mirror is present around the mirror, it is necessary to widen the above described distance to a certain extent than a half of the minimum diameter of the exit pupil, but it is advisable to set within 10% of the distance (conjugate length) between the object surface and the image plane (conjugate points on the reduction side as well as on the magnification side). In addition, setting of "the minimum diameter of the pupil" is intended for application in case of different pupil diameters in two mutually perpendicular directions on the pupil plane as well. Here, the minimum diameter of the pupil is the diameter of the inscribed circle of the external shape of the pupil.

Here, as another feature, in the present embodiment, employing aspherical surface for the zoom optical system, aberrations are corrected well. The zoom optical system of the present embodiment is compact, derives high magnification, and simultaneously, unlike the zoom optical systems for an exposure apparatus having been disclosed in Japanese Patent Application Laid-Open No. 2002-207167 and Japanese Patent Application Laid-Open No. 2002-055279, is suitable for an optical apparatus that requires a wide-angle optical system such as a projector etc. with the focal length at the wide angle end being smaller than the zoom optical systems in Japanese Patent Application Laid-Open No. 2002-207167 and Japanese Patent Application Laid-Open No. 2002-055279. Therefore, due to a large refractive power that the zoom optical system has, simultaneous correction of the spherical aberration and the chromatic aberration across the entire zooming range will become difficult. The reason hereof is that the chromatic aberration arises significantly due to a strong positive refractive power of the entire optical system, and it becomes more difficult to correct the chromatic aberration while correcting the spherical aberration than in an optical system with the refractive power being comparatively weak.

Therefore, in the present embodiment, with compactness being maintained, aspherical surface is used in order to correct the chromatic aberration, and the spherical aberration is corrected with degrees of freedom of the shape taken by the aspherical surface. In particular, employment of the aspherical surface that has a large diameter gives rise to a large aberration correction effect. Embodiments 1 and 2 are shown with the zoom optical system that has utilized the aspherical surface.

Embodiment 1

Figure 5:
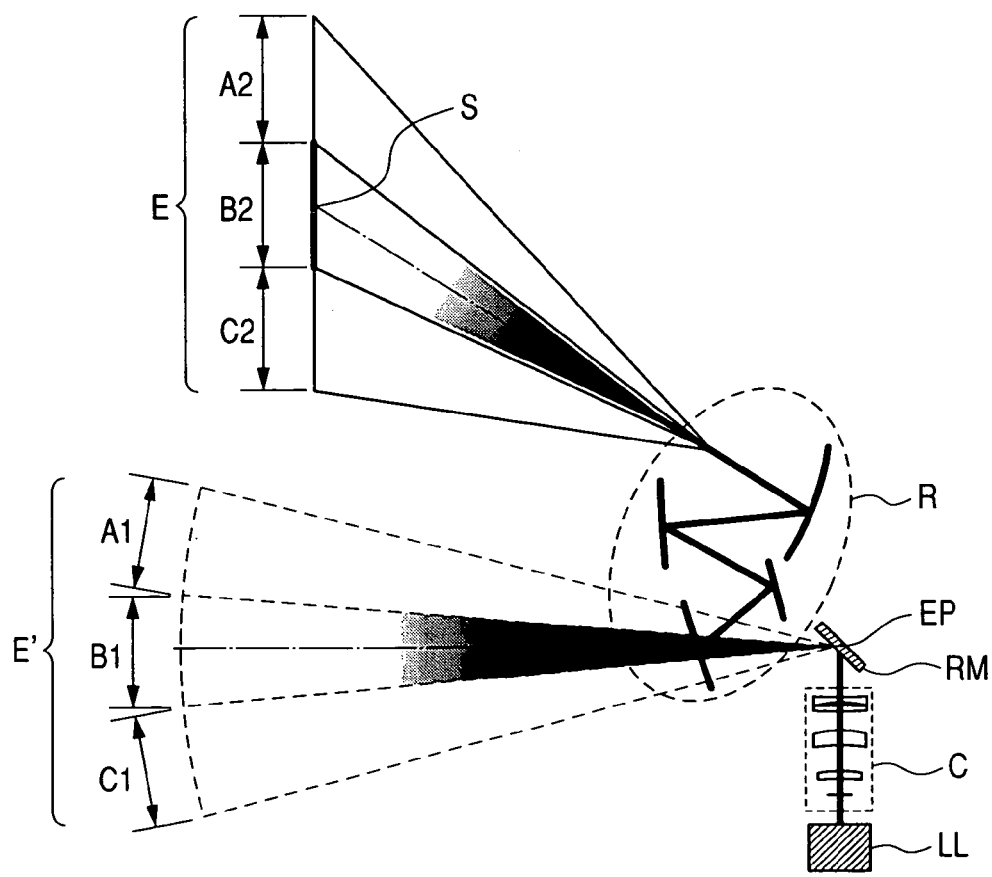
FIG. 5 is a diagram showing a principle of changing a projecting direction in an image projecting apparatus for which a zoom optical system of Embodiment 1 is used.

FIG. 5 shows an image projecting apparatus comprising a projecting optical system subject to combination of a zoom optical system of an embodiment of the present invention and an Off-Axial optical system. Here, the Off-Axial optical system is defined as an optical system including a curved surface (Off-Axial curved surface) with a normal to the surface at the intersection between the reference axis and the configuring surface being not present on the reference axis where the reference axis is defined as the route traced by a light beam that passes the image center and the pupil center. In this case, the reference axis will be in a bent shape. Making the configuring surfaces of the optical system asymmetrical and aspherical, an optical system that has sufficiently undergone correction of the aberration can be configured (see Japanese Patent Application Laid-Open No. H09-005650, Japanese Patent Application Laid-Open No. H08-292371, Japanese Patent Application Laid-Open No. H08-292372 and Japanese Patent Application Laid-Open No. H09-222561).

In addition, in this Off-Axial optical system, the constituent surfaces will be generally not co-axial, vignetting does not arise even on a reflecting surface and therefore an optical system with a reflecting surface is easily established. In addition, forming an intermediate image in the optical system, an optical system that has a wide view angle and is nevertheless compact can be configured. Moreover, such an optical system can be configured that is an optical system with the front stop and is nevertheless compact since the optical path can be designed comparatively freely.

In the present embodiment, employing such an Off-Axial optical system, a projecting optical system with a wide view angle, high fineness and high magnification can be realized, and moreover employing such a zoom optical system of the present embodiment and rotating a flat surface mirror to be described later, it will become possible to move significantly or incline (that is, vary the projecting angle) the position of the projected image with less deterioration in image quality.

Here, a basic principle for varying the projection angle while keeping good optical performance will be described with reference to FIG. 5.

In FIG. 5, reference character LL denotes an image forming element such as a liquid crystal panel etc. and an illumination system for radiating light modulated by the image forming element. Reference character C denotes an optical block having the image forming capability. The light emitted from the illumination system and having undergone modulation by the image forming element is reflected by a rotatable flat surface mirror RM and thereafter undergoes image forming into the area B1 of the spherical surface E' with the position of the exit pupil EP of the first optical block C being the center of curvature. Here, it is advisable that the first optical block C is capable of image forming on the curved surface area B1, and therefore it may be an optical block of co-axially rotational symmetry or may be an optical block including a reflecting surface having curvature as a constituent. However, in the present embodiment, the first optical block C is configured by a zoom optical system related to the present invention.

Moreover a flat surface mirror RM arranged in the position of the exit pupil EP is caused to rotate on the sheet surface of FIG. 5, and then the image formed in the area B1 moves to the areas A1 or C1 on the spherical surface E', accompanying few optical changes. That is, the image moves in a continuous fashion on the spherical surface E' with still retaining the state of image forming.

Thus the light reflected by the flat surface mirror RM is lead to a second optical block R as an Off-Axial optical system with a plurality of reflecting surfaces with curvature as constituent. At this time, the second optical block R is designed to bring an image on the spherical surface E' into image forming onto a screen E with good optical capability. Moreover characteristics of the Off-Axial optical system enable an image to be obliquely projected to the screen E without causing any image distortion to arise.

Accordingly, in a sate of the flat surface mirrors RM rotating in the position to direct the light to the area B1, an image of the original formed on the image forming element is displayed in the area B2 on the screen E via the first optical block C, the flat surface mirror RM and the second optical block R.

In addition, rotating the flat surface mirror RM, images formed in the areas A1, B1 and C1 on the spherical surface E' can be formed in the areas A2, B2 and C2 on the screen E. That is, the image can be projected with any projecting angle onto the range (screen E) that the second optical block R secures good optical performance. However, the member rotating around the exit pupil EP of the first optical block C as the center will not be limited to the flat surface mirror RM, but the first optical block C and the image forming element may be caused to rotate integrally, or the second optical block R may be rotated. As these are relative rotation of the above described optical block, rotation of any optical block is optically equivalent.

Moreover in the area B1 on the spherical surface E', image forming does not always have to take place on the spherical surface. That is, the spherical surface E' does not have to be a spherical surface. In other words, in order to make the projecting angle variable, the image of the first optical block C is required to move in a continuous fashion with good optical characteristics being kept, and in order to realize it ideally, the surface E' is desired to be a spherical surface. However, actually, since tolerance of the optical characteristics such as focal depth, distortion and the like is limited within a range, in case of falling within this tolerance, surface E' may have any surface shape, and does not necessarily have to be a spherical surface. Here, positional accuracy of the flat surface mirror RM arranged in the position of the exit pupil does not have to strictly correspond to the position of the exit pupil of the first optical block C, and it is advisable that correspondence is implemented within a range of tolerance to a certain extent.

Moreover, the image forming capability of the first optical block C will be described further in detail. In case of making an image plane S movable two-dimensionally on a screen E by a projecting optical system of the present embodiment, as long as the aberration of entire angle of view arises uniformly respectively in each azimuth direction, the aberration does not have to undergo sufficient correction. The reason thereof is that, if the aberration of entire angle of view arises uniformly, correction can be derived by the second optical block R configured by a reflecting surface having a curvature.

In addition, in case of making a position of the image plane S movable only in the one-dimensional direction on the screen E, as long as the aberration of entire angle of view arises uniformly only in the mobile direction, an image forming performance in the direction different from the moving direction does not have to be good. The reason thereof is also that the second optical block R can implement correction.

Here, only the principle about movement of the image plane on the sheet surface in FIG. 5 was described, but this is likewise applicable to the case where the image plane is moved in the direction perpendicular to the sheet surface. However, a member of rotating around the exit pupil EP of the first optical block C as a center is only a flat surface mirror RM, in the case where the image plane is moved two-dimensionally on the screen E, it is advisable that a flat surface mirror in charge of rotation in the horizontal direction and a flat surface mirror in charge of the vertical direction are used. The reason thereof is that, in FIG. 5, when the flat surface mirror RM is caused to rotate in the direction perpendicular to the sheet surface in the drawing, the image forming element and the flat surface mirror RM will be disposed to derive a twisted relationship, a light beam on the reference axis on the screen E undergoes image forming onto a desired location, but the image plane S rotates on the screen E.

However, it is physically impossible to arrange a plurality of flat surface mirrors onto the exit pupil EP of the first optical block C. Therefore, even if the flat surface mirror RM is not strictly disposed in the position of the exit pupil EP, the image on the spherical surface E' falls within the range of tolerance of optical performance, two flat surface mirrors RM can be arranged in the vicinity of the exit pupil EP subject to displacement to such a degree that will not cause mutual interference.

Next, the case where the zooming is implemented in these projecting optical system and image projecting apparatus will be described. If the first optical block C is caused to have zooming function to vary the size of the image formed in the areas A1, B1 and C1 on the spherical surface E' formed by the first optical block C, it is possible to vary the size of the image formed in the areas A2, B2 and C2 on the actual image plane (screen) E.

However, based on the description on the above described principle, in order to rotate the mirror RM in the position of an exit pupil EP of the first optical block C, the position of the exit pupil EP is desired to be kept always constant during zooming. With the position of the exit pupil EP being constant, the mirror RM and the second optical block R can be arranged in fixed positions.

In a normal camera lens, the object surface and the image plane are required not to vary in position regardless of focal length varying continuously, and in addition hereto, the first optical block C of the present embodiment, that is, the zoom optical system related to the present invention is required that positions of the entrance pupil and the exit pupil are kept constant regardless of variation of the focal length. Here, the reason why the position of the exit pupil is required to be constant is as described in the above described principle, but as concerns the position of the entrance pupil, that the telecentricity is required in the case where a liquid crystal panel is used as an image forming element.

As follows, in a 3-plate type image projecting apparatus which synthesizes the red, green and blue modulated lights to enter the first optical block C, a further specific configuration of a zoom optical system that secures a sufficient space (that is, the back focus of the first optical block C) for inserting color synthesizing elements etc. between the image-forming element and the first optical block C (zoom optical system), that is excellent in telecentricity on the object side and that is excellent in the immobility of the positions of the object surface, the image plane, the entrance pupil and the exit pupil to variation of the focal length will be described.

Figure 6:
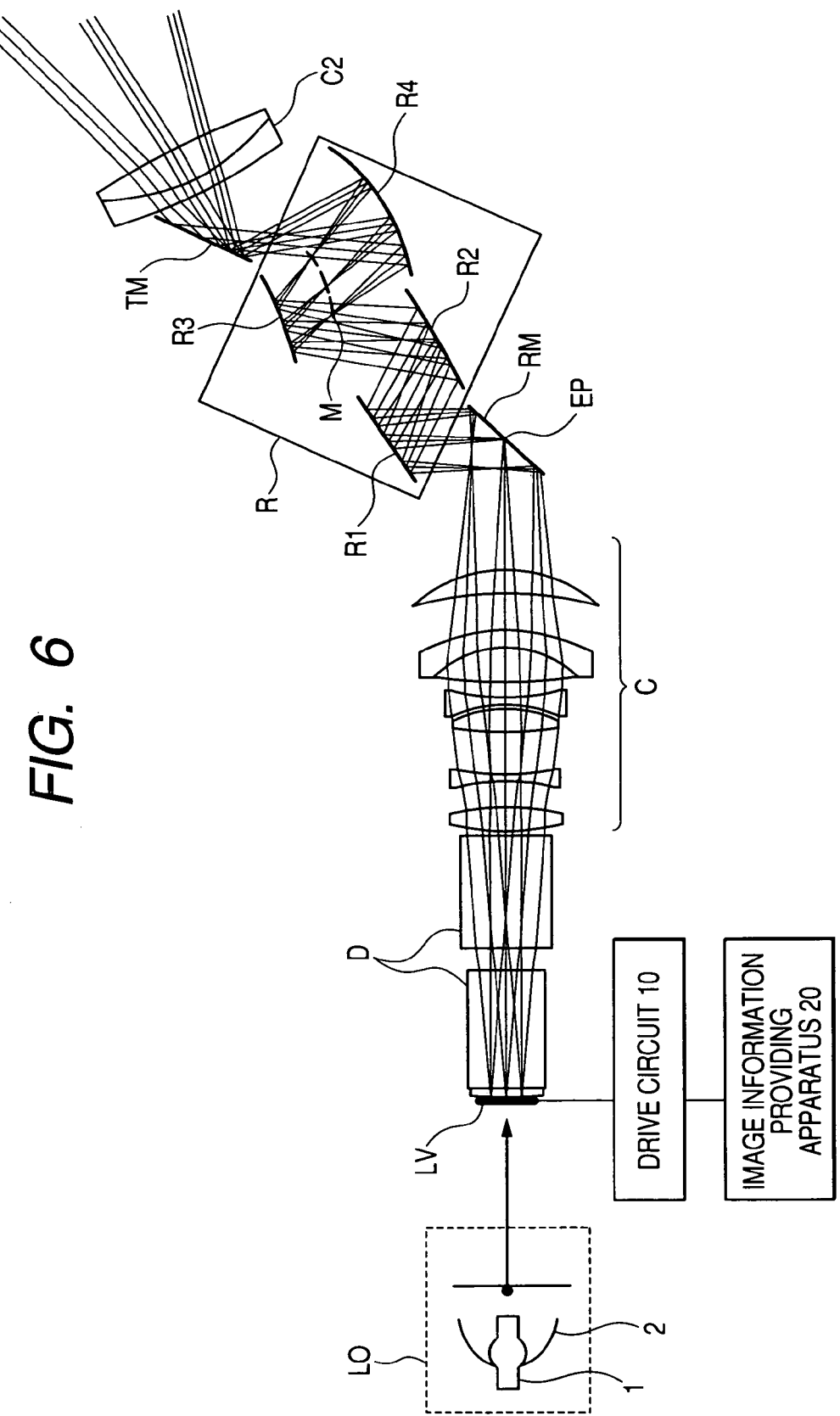
FIG. 6 is a sectional diagram showing an image projecting apparatus of Embodiment 1 and a projecting optical system used therein.

FIG. 6 shows an entire configuration of a 3-plate type image projecting apparatus. In FIG. 6, reference character LO denotes an illuminating system, which has a white light source lamp 1, a reflecting mirror 2, a (not shown) color splitting element of splitting the white light from the light source lamp 1 into components of three colors of red, green and blue.

Reference character LV denotes a liquid crystal display panel of a transparent type as an image forming element. To this liquid crystal display panel LV a drive circuit 10 is connected. An image information providing apparatus 20 such as a personal computer, a DVD player, a video (VCR), a television, a digital video or a still camera and a reception unit consisting of an antenna of receiving images in radio waves and a tuner etc. is connected to the drive circuit 10. The drive circuit 10 in reception of image information from the image information providing apparatus 20 delivers a drive signal corresponding with the image information to the liquid crystal display panel LV. The liquid crystal display panel LV in reception of the drive signal forms an original corresponding with the drive signal to modulate the illuminating light from the illuminating system LO. The present embodiment is provided with three liquid crystal display panels LV respectively for red, green and blue, which are not shown though, to form originals for red, green and blue.

Here, in the present embodiment, the case where a liquid crystal display panel of a transparent type is used as an image forming element is described, but the present invention will not be limited thereto, but is applicable to the case where a liquid crystal display panel of a reflection type and a digital micro mirror array (DMD) are used and to the case where a self-luminous element (electroluminescence element) that does not require any illumination system is used.

Reference character D denotes a dichroic prism as a color synthesizing element for synthesizing color light modulated with three liquid crystal display panels LV. Dichroic prism D is provided with a plurality of dichroic films to synthesize three color lights with transparent or reflecting operation corresponding with wavelength at these dichroic films. FIG. 6 shows two dichroic prisms, and it is advisable that this is varied in accordance with what the image forming element LV requires. In addition, instead of a dichroic prism, a polarizing beam splitter may be used.

Reference character C denotes a zoom optical system configuring the first optical block in FIG. 5, and a refractive optical unit (hereinafter to be referred to as "first refractive optical unit") configured as a coaxial optical system by a plurality of lens units. Reference characters EP denotes an exit pupil of the zoom optical system, and also an entrance pupil of the reflecting optical unit R as a second optical block being an Off-Axial optical system configured by a plurality of reflecting surfaces R1 to R4. Here, in this position or in the vicinity of this position, a stop may be provided in accordance with necessity.

The light subject to color synchronization with the dichroic prism D travels via a first refractive optical unit C, a first flat surface mirror RM that can rotate at the position of the exit pupil EP and reflecting optical units (R1 to R4) and moreover, via the second flat surface mirror TM and the second refractive optical unit C2, is enlarged and projected onto a not shown screen being a surface to be projected. Here, this second refractive optical unit C2 is configured by a cemented lens consisting of one negative lens (negative meniscus lens shaped convex to the reduction conjugate side) and one positive lens (biconvex lens), but is not limited thereto. Of course, not a cemented lens but a negative lens and a positive lens may be arranged at an interval, or a biconcave lens and a biconvex lens may be used for configuration, or a negative meniscus lens being convex to the magnification conjugate side and a positive meniscus lens likewise being convex to the magnification conjugate side may be cemented. In addition, only one positive lens (desirably a positive lens being convex to the magnification conjugate side) or one negative lens may be used for configuration. However, preferably the number of refractive optical elements disposed on the projected surface side of the reflecting optical system is preferably not more than 4.

In addition, the projecting optical system configured by the first and the second refractive optical units C and C2, the first and the second flat surface mirrors RM and TM and moreover a reflecting optical unit R corrects trapezoidal distortion well by the reflecting optical unit R as an Off-Axial optical system and obliquely projects an image onto the screen.

In addition, causing the projecting optical system to include the first refractive optical unit C, the first refractive optical unit C and the reflecting optical unit R can be appropriately assigned to take shared charge of the optical power required for enlarging/projection onto the screen. Therefore, curvature of each reflecting surface of the reflecting optical unit R is made moderate so that manufacturing can be made simple and the sensibility to manufacturing errors can be reduced. Here, an influence of astigmatism difference etc. due to manufacturing errors of the reflecting surface become large on the surface closer to a pupil. In addition, astigmatism difference etc. having arisen on the first reflecting surface closest to the exit pupil EP among a plurality of reflecting surfaces are magnified in accordance with magnification of this reflecting optical unit. Accordingly, sensibility of the reflecting optical system can be reduced by sharing assignment of magnification (optical power) required for image projection with a refractive optical system being low in sensibility susceptible to capability deterioration due to manufacturing errors compared with a reflecting optical system.

Moreover, even in case of projecting optical system being of wide angle, setting focal length of the first refractive optical unit C long, occurrence of a magnification chromatic aberration will be restrained comparatively easily. A chromatic aberration does not arise in the reflecting optical unit R, that is effective for correction on the respective aberrations.

In FIG. 6, any of the reflecting surfaces R1 to R4 (all of these reflecting surfaces R1 to R4 have optical power) configuring a reflecting optical unit R is in rotational asymmetrical shape and configures the Off-Axial optical system with reference axis being bent as described above.

Moreover, the present embodiment undergoes intermediate image forming once (intermediate image forming surface M) between the reflecting surfaces R3 and R4 in the reflecting optical unit R (a surface, that is conjugate to both of the liquid crystal display panel and the screen, is formed between R3 and R4 in the reflecting optical units). Thereby, compared with the case of absence of an intermediate image forming surface, the size of each reflecting surface can be made small, which is therefore effective in manufacturing the surface face accurately. Here, the position of the intermediate image forming surface will not be limited to the position shown in FIG. 6. In the present embodiment, the reflecting optical unit R includes four reflecting surface having optical powers, but will not be limited thereto, and any number of planes, nevertheless, being two or more planes (preferably 3 planes or more), will do. Among them, if the zoom optical system is configured so that the intermediate image is formed between the reflecting surface at the most screen side and the second reflecting surface from the most screen side, the size of each reflecting surface can be made small.

Accordingly, according to the principle of varying the projection angle described with reference to FIG. 5 in the projecting optical system shown in FIG. 6, the projecting angle of an image from the projecting optical system can be changed by rotating the first flat surface mirror RM.

The zoom optical system of the present embodiment secures a sufficient space for inserting color synthesizing elements etc., is excellent in telecentricity on the object side, is excellent in the immobility of the positions of the object surface, the image plane and the exit pupil to variation of the focal length, secures a space for arranging a rotatable mirror between a lens unit closest to the exit pupil and the exit pupil position and is suitable to an Off-Axial optical system having the function of moving the image plane and an image projecting apparatus using the same.

The zoom optical system of the present Embodiment 1 and Embodiment 2 to be described later corresponds with the zoom partial system of the projecting optical system with the liquid crystal panel size being 0.7 inch and the aspect ratio 4:3.

FIG. 2A and FIG. 2B show respectively X-Z sectional views as well as Y-Z sectional views of configurations of a zoom optical system configuring the first refractive optical unit C. As described above, this zoom optical system is used as a partial system configuring a part of the projecting optical system. Here, in this drawing, reference characters LV, D and EP denote the same constituents as the reference characters in FIG. 6 do.

FIG. 2A and FIG. 2B, the zoom optical system is configured, in order from the reduction side to the magnification side (in the present embodiment, from the liquid crystal display panel LV side being the object side to the spherical surface area B1 side being image side: hereinafter reference character B1 is referred to as an image plane), by a first lens unit G1 having a positive refractive power, a second lens unit G2 having a negative refractive power, a third lens unit having a positive refractive power and a fourth lens unit having a positive refractive power. The first to fourth lens units G1 to G4 respectively move integrally along the optical axis AXL during zooming (varying the focal length) so that intervals between respective lens units vary.

In addition, this zoom optical system is always substantially telecentric on the object side under the all focal length states, that is, in the entire zooming range, between the maximum focal length (telephoto end) and the minimum focal length (wide angle end), and the position of the exit pupil EP located between the fourth lens unit G4 and the image plane B1, the position of the reduction-side conjugate point where the liquid crystal display panel LV is arranged and the position of the magnification-side conjugate point where the image plane B1 is located are substantially immobile respectively.

Here, "the position of the image plane B1 (the position of magnification-side conjugate point) is immobile" means that the position of this image plane B1 and the position of the liquid crystal display panel (the position of reduction-side conjugate point) remain substantially unchanged. Specifically, the distance between the conjugate point of the liquid crystal display panel formed by the optical system (including the first refractive optical unit C) arranged between this liquid crystal display panel and the exit pupil and the liquid crystal display panel (the distance on the optical path of the light beam passing the optical axis of the first refractive optical unit) changes only as much as 5% (preferably 3% and more preferably 1%) in the entire zooming range (from the wide angle end to the telephoto end). The phrase "the distance changes" quoted here means that the minimum value of the distance within the entire zooming range is present within the range of discrepancy not more than 5% of the maximum value to the maximum value (that is, the maximum value×0.95≦the minimum value).

The position of the exit pupil is likewise, and it is meant that the position of the exit pupil is immobile with respect to the position of a liquid crystal display panel. In addition, the minimum value in the entire zooming range of the distance between the exit pupil and the liquid crystal display panel is not less than 95% (preferably not less than 97% and more preferably not less than 99%) of the maximum value.

Here, in particular the position of the exit pupil EP being "substantially immobile" means that displacement of 2 to 3% and preferably up to 1% of the distance between the magnification-side conjugate point and the reduction-side conjugate point is tolerant. The reason hereof is that a range of tolerance of the optical characteristics such as the focal depth or distortion etc. is, actually, present as described above.

In addition, in the zoom optical system, during zooming from the wide angle end to the telephoto end, the interval between the first lens unit G1 and the second lens unit G2 increases monotonously while the interval between the second lens unit G2 and the third lens unit G3 decreases monotonously. In addition, the interval between the third lens unit G3 and the fourth lens unit G4 increases monotonously. That is, the interval between the first lens unit G1 and the second lens unit G2 at the telephoto end is wider than that at the wide angle end, the interval between the second lens unit G2 and the third lens unit G3 at the telephoto end is narrower than that at the wide angle end and the interval between the third lens unit G3 and the fourth lens unit G4 at the telephoto end is wider than that at the wide angle end. And, during zooming from the wide angle end to the telephoto end, the interval between the first lens unit G1 and the fourth lens unit G4 increases.

In addition, the position of the first lens unit G1 at the telephoto end is closer to the reduction side conjugate point (LV) than the position of the first lens unit G1 at the wide angle end is while the position of the fourth lens unit G4 at the wide angle end is closer to the magnification side conjugate point (B1) than the position of the fourth lens unit G4 at the wide angle end is Providing an additional account, during zooming from the wide angle end to the telephoto end, the fourth lens unit G4 approaches the pupil EP on the magnification side.

In addition, in the present embodiment, as shown in FIGS. 2A and 2B, the relationship between the width Eo in the Y axis direction of the exit pupil EP and the width Er in the X axis direction will be:

Eo<Er, (for example, Er=2Eo). That is, the diameter of the exit pupil EP in the Y axis direction is different from that in the X axis direction, and the minimum diameter will be Eo.

In addition, the image B1 in FIG. 2A is able to be moved by rotating the flat surface mirror RM disposed in the position of the exit pupil EP as described in the principle of varying the above described projecting direction.

In the present Embodiment 1, the first lens unit G1 is caused to have a positive refractive power in order to secure the back focus and derive a bright optical system while keeping the entire zoom optical system compact.

Hereinafter, as the numerical embodiment 1 corresponding with Embodiment 1 shown in FIGS. 2A and 2B, the configuring data of the zoom optical system is shown in Table 1. In Table 1, "surface number" i refers to the "i"-th surface counted from the object side. The "curvature radius" refers to a paraxial curvature radius (mm) of the "i"-th surface, the "surface interval" refers to an interval (mm) between the "i"-th surface and the "i+1"-th surface and "refractive index" and "Abbe constant" respectively refer to the refractive index and the Abbe constant of the medium between the "i"-th surface and the "i+1"-th surface. These definitions will be applicable to the following numerical embodiments. In addition, FIG. 13 shows the refractive power of respective lens units in the present numerical embodiment 1.

Moreover, in the present numerical embodiment, respective aberrations are corrected well by configuring the 14th surface having the maximum diameter among the zoom optical systems as an aspherical surface.

Here, aspherical surface shape is to be expressed by the following Expression (2), taking Z axis in the optical axis direction and r axis in the direction perpendicular to the optical axis, and with a traveling direction of light being positive, with the conic constant being K and the coefficient of the 4-th to the 10-th deformation being A to D, while constants and coefficients in the Expression are indicated in Table 2 of Embodiment 2. Here, a set of characters "E-X" denotes "×10$^{-x}$". In addition, reference character c denotes a curvature of the surface vertex.

$$z(r) = \frac{cr^2}{\sqrt{2-(1+K)c^2r^2}} + Ar^4 + Br^6 + Cr^8 + Dr^{10} \quad (2)$$

TABLE 1

<<Numerical Embodiment 1>>

Liquid crystal panel size: 0.7 inch
(maximum object height of 8.89 mm)
Focal length fz: 74.0 to 111.0
Zoom ratio: 1.50
Aperture stop diameter: 40.0 mm

| surface number object surface | curvature radius infinite | surface interval variable | refractive index | Abbe constant |
|---|---|---|---|---|
| 1 | 55.4025 | 4.9816 | 1.743972 | 44.8504 |
| 2 | −59.5194 | 8.3439 | | |
| 3 | −57.7241 | 3 | 1.521304 | 54.8272 |
| 4 | 51.6031 | variable | | |
| 5 | 70.7295 | 3.9104 | 1.741103 | 45.0751 |
| 6 | −81.3061 | 2.1799 | | |
| 7 | −25.829 | 3 | 1.755201 | 27.5795 |
| 8 | 60.3351 | variable | | |
| 9 | 303.3369 | 11.0747 | 1.541686 | 65.3084 |
| 10 | −22.9177 | 0.1 | | |
| 11 | −23.0008 | 3 | 1.74801 | 36.5426 |
| 12 | −45.2477 | variable | | |
| 13 | −111.1783 | 7.737 | 1.687511 | 47.3584 |
| 14 (aspherical surface) | −34.1932 | variable | | |
| 15 | infinite | 250 | | |
| 16 (image plane) | −250 | 0 | | |

Coefficient of aspherical surface 14-th surface K (conic coefficient): −0.331819
A(4-th): −0.652047E−7
B(6-th): −0.302567E−9

TABLE 1-continued

<<Numerical Embodiment 1>>

C(8-th): −0.105026E−12
D(10-th): −0.788268E−16

Variable interval

| fz | 74 | 83.25 | 92.5 | 101.75 | 111 |
|---|---|---|---|---|---|
| d0 | 49.4452 | 46.0267 | 45 | 45.7361 | 47.9362 |
| d4 | 0.4114 | 9.3065 | 15.9238 | 21.0646 | 25.15 |
| d8 | 7.8767 | 6.926 | 5.3013 | 3.2911 | 1.019 |
| d12 | 1.6669 | 5.2116 | 9.3595 | 13.8657 | 18.5673 |
| d14 | 43.2724 | 35.2018 | 27.088 | 18.715 | 10 |

Here, the back focus (the distance between the first lens unit and the reduction-side conjugate position) in the above described Table 1 will be not less than 45 (mm) and not more than 49.4452 (mm). This value is a value derived by the back focus having undergone air conversion, being desired to be 35 mm or more (preferably 40 mm or more) across the zooming range. In other words, 45% or more (preferably 50% or more) of focal length at the wide angle end of the zoom optical system is preferable. Moreover, this back focus is around approximately 5.06 times to 5.56 times higher than the maximum object height (8.89 mm) across the entire zooming range. This back focus is desired to be three times or more (preferably four times or more) higher and is desired to be ten times or less (preferably seven times or less) than the maximum object height. These are accountable to the following numerical embodiment 2 (back focus length of 45 to 52.4229 mm, and this is around approximately 5.06 times to 5.56 times higher than the maximum object height) as well.

In addition, the zoom ratio (the value derived by dividing the focal length at the telephoto end by the focal length at the wide angle end) of the present embodiment is set to 1.50 but will not be limited thereto. Here, at least 1.2 times or more (preferably 1.3 times or more and more preferably 1.4 times or more) will do. The upper limit value is desired to be 3.0 times or less and preferably 2.5 times or less, more preferably 2.0 times or less. This is also accountable to the following Numerical Embodiment 2 (magnification proportion of 1.90) as well.

FIG. 9 shows that the interval between the exit pupil and the image side principal point position of the present numerical embodiment 1 is substantially equal to the focal length of the zoom optical system. As apparent from this drawing, each lens unit is arranged so that the distance fz from the image side principal point to the exit pupil substantially corresponds to each focal length, and therefore, in addition to the object surface and the image plane, the exit pupil surface can be made immobile during zooming.

Moreover, in FIG. 10, theoretical values of Expression (1) is indicated with a solid line and the actual principal point interval with each focal length derived by dividing the range of the focal length equally by five is plotted with void marks. From this drawing, it is apparent that the interval between the object side principal point and the image side principal point in the present numerical embodiment 1 is substantially equal to the values of Expression (1).

Figure 7:
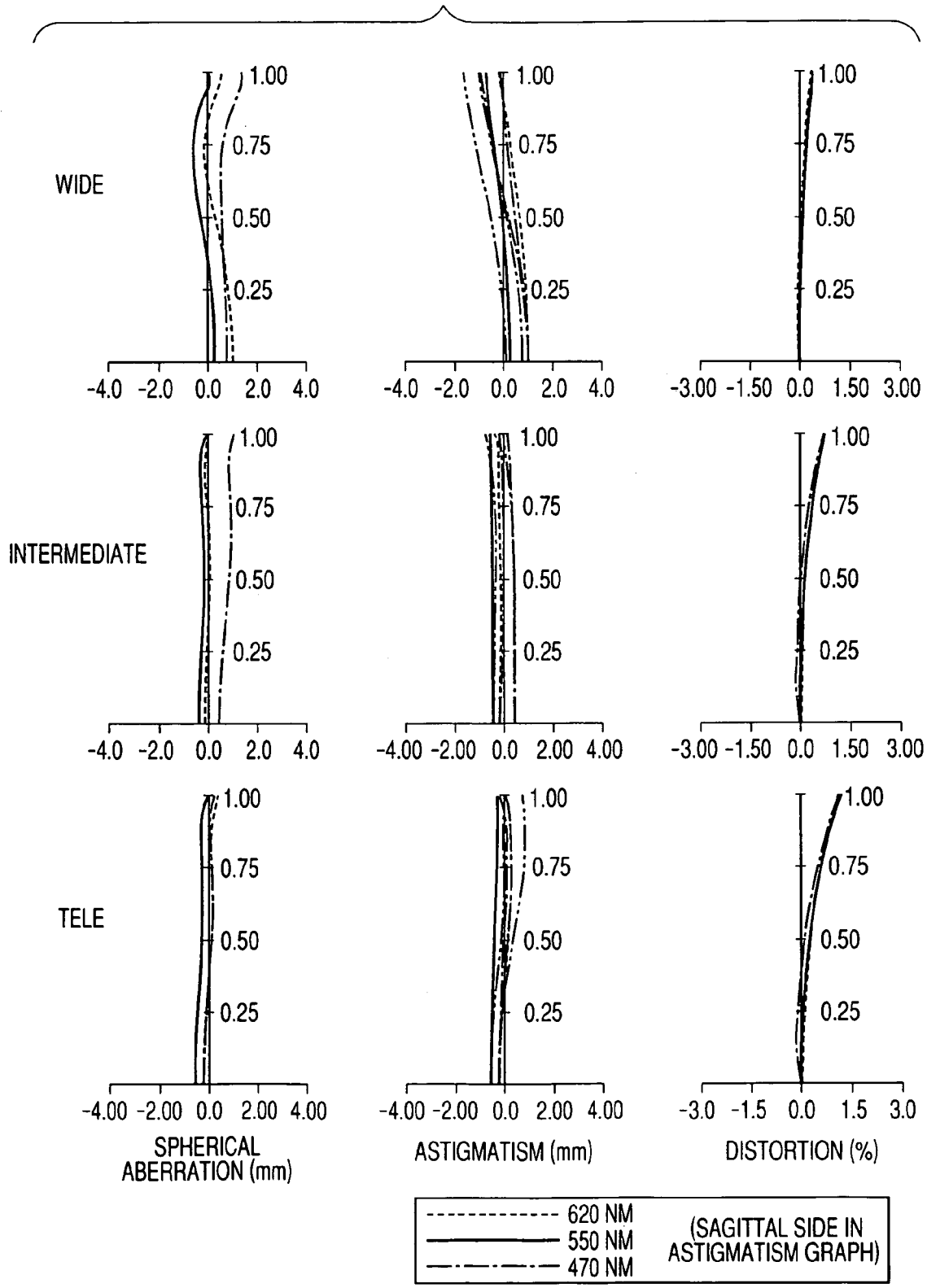
FIG. 7 is a longitudinal aberration graph of Numerical Embodiment 1 of the present invention.

In addition, longitudinal aberration graphs of the present numerical embodiment 1 are shown in FIG. 7. FIG. 7 shows longitudinal aberration graphs in wide angle (74 mm focal length), middle (92.5 mm focal length) and tele (111 mm focal length) in order from the top. The wavelengths of assessment light beams are 620 nm (red R), 550 nm (green G) and 470 nm (blue B). From this drawing, it is apparent that image forming has been implemented well.

Embodiment 2

FIG. 3A and FIG. 3B show respectively X-Z sectional views as well as Y-Z sectional views of configurations of a zoom optical system of Embodiment 2 of the present invention which configures the first refractive optical unit C shown in FIG. 6. This zoom optical system is used as a partial system configuring a part of the projecting optical system. Here, in this drawing, reference characters LV, D and EP denote the same constituents as the reference characters in FIG. 6 do.

In FIG. 3A and FIG. 3B, the zoom optical system has, in order from the reduction side to the magnification side (in the present embodiment, from the liquid crystal display panel LV side being the object side to the spherical surface area B1 side being image side: hereinafter reference character B1 is referred to as an image plane), a first lens unit G1 having a positive refractive power, a second lens unit G2 having a negative refractive power and a third lens unit having a positive refractive power.

Here, a second lens unit G2 is configured by two lens units of a 2a-th lens sub unit G2a having a negative refractive power and a 2b-th lens sub unit G2b having a positive refractive power, that is, it can be considered the zoom optical system is in a 4-lens unit configuration.

The second lens unit consists of three lenses, but first two lenses (5th surface to 8th surface) in view from the reduction side are a 2a sub lens unit and the optical power is negative of −0.0168136. The last one lens (9th surface to 10th surface) is the 2b sub lens unit, the optical power is positive of +0.00942778.

The first to third lens units G1 to G3 respectively move integrally along the optical axis AXL during zooming (varying the focal length) so that intervals between respective lens units vary.

In addition, this zoom optical system always is substantially telecentric on the object side under the all focal length states, that is, in the entire zooming range, between the maximum focal length (telephoto end) and the minimum focal length (wide angle end), and the position of the exit pupil EP located between the third lens unit G3 and the image plane B1, the position of the reduction-side conjugate point where the liquid crystal display panel LV is arranged and the position of the magnification-side conjugate point where the image plane B1 is located are substantially immobile respectively.

In addition, in the zoom optical system, during zooming from the wide angle end to the telephoto end, the interval between the first lens unit G1 and the second lens unit G2 increases monotonously. In addition, the interval between the second lens unit G2 and the third lens unit G3 decreases once from the wide angle end and thereafter increases toward the telephoto end. That is, the interval between the first lens unit G1 and the second lens unit G2 at the telephoto end is wider than the interval at the wide angle end while the interval between the second lens unit G2 and the third lens unit G3 at the telephoto end is wider than the interval at the wide angle end. And, during zooming from the wide angle end to the telephoto end, the interval between the first lens unit G1 and the third lens unit G3 increases monotonously In addition, the position of the first lens unit G1 at the telephoto end is closer to the reduction side conjugate point (LV) than the position of the first lens unit G1 at the wide angle end is while the position of the third lens unit G3 at the telephoto end is closer to the magnification side conjugate point (B1) than the position of the third lens unit G3 at the wide angle end is. Providing an additional account, during zooming from the wide angle end to the telephoto end, the third lens unit G3 approaches the pupil EP on the magnification side.

In addition, in the present embodiment, as shown in FIGS. 3A and 3B, the relationship between the width Eo in the Y axis direction of the exit pupil EP and the width Er in the X axis direction will be:

Eo<Er, (for example, Er=2Eo). That is, the diameter of the exit pupil EP in the Y axis direction is different from that in the X axis direction, and the minimum diameter will be Eo.

In addition, the image B1 in FIG. 3A is moved by rotating the flat surface mirror RM disposed in the position of the exit pupil EP as described in the principle of varying the above described projecting direction.

In the present Embodiment 2, the first lens unit G1 is caused to have a positive refractive power in order to secure the back focus and derive a bright optical system while keeping the entire zoom optical system compact.

Hereinafter, as the numerical embodiment 2 corresponding with Embodiment 2 shown in FIGS. 3A and 3B, the configuring data of the zoom optical system is shown in Table 2.

The synthesized refractive power of respective lens units that move integrally during zooming is positive for the first lens unit G1, negative for the second lens unit G2 (negative for the 2a-th lens sub unit G2a and positive for the 2b-th lens sub unit G2b) and positive for the third lens unit. That is, as described above, the configuration of the present embodiment (numerical embodiment) can be deemed as a 4-lens unit configuration as shown in FIG. 13, and in this case, can be treated as the one configured by positive-negative-positive-positive lens units in order from the reduction side.

Here, in the present embodiment, respective aberrations are corrected well by configuring the 12th surface having the largest diameter among the zoom optical systems as an aspherical surface.

TABLE 2

<<Numerical Embodiment 2>>

Liquid crystal panel size: 0.7 inch
(maximum object height of 8.89 mm)
Focal length fz: 74.7 to 142.0
Zoom ratio: 1.90
Aperture stop diameter: 40.0

| surface number object surface | curvature radius infinite | surface interval variable | refractive index | Abbe constant |
|---|---|---|---|---|
| 1 | 42.8622 | 4.4467 | 1.676808 | 40.9032 |
| 2 | −708.8428 | 0.5862 | | |
| 3 | 35.4807 | 3.1865 | 1.709598 | 29.6932 |
| 4 | 25.1107 | variable | | |
| 5 | −20.0291 | 6.3603 | 1.75163 | 31.3834 |
| 6 | 1734.7302 | 2.4873 | | |
| 7 | −432.9913 | 8.7024 | 1.565048 | 63.5961 |
| 8 | −35.7122 | 0.1 | | |
| 9 | −78.9883 | 8.6282 | 1.48749 | 70.4058 |
| 10 | −32.4309 | variable | | |

TABLE 2-continued

<<Numerical Embodiment 2>>

| 11 | 179.6767 | 5.6195 | 1.602739 | 61.267 |
|---|---|---|---|---|
| 12 (aspherical surface) | −151.5641 | variable | | |
| 13 | infinite | 240 | | |
| 14 (image plane) | −240 | 0 | | |

Aspherical surface quantity

12th surface K (conic coefficient): 10.392636
A (4th): 0.55239E−6
B (6th): 0.194218E−10
C (8th): 0.215610E−12
D (10th): −0.175710.E−15

Variable interval

| fz | 74.7 | 91.5252 | 108.35 | 125.175 | 142 |
|---|---|---|---|---|---|
| d0 | 52.4229 | 48.4852 | 45.9646 | 45 | 45.8383 |
| d4 | 8.9516 | 31.7698 | 44.2687 | 51 | 54.6467 |
| d10 | 0.9779 | 0.1 | 7.283 | 17.9537 | 29.398 |
| d12 | 77.5306 | 59.5279 | 42.3667 | 25.9293 | 10 |

FIG. 11 shows, likewise the 4-lens unit configuration (the configuration of Embodiment 1), that the interval between the exit pupil and the image side principal point position of the present numerical embodiment 2 is substantially equal to the focal length of the zoom optical system. As apparent from this drawing, each lens unit is arranged so that the distance fz from the image side principal point to the exit pupil substantially corresponds to each focal length, and therefore, in addition to the object surface and the image plane, the exit pupil surface can be made immobile during zooming. That is, in the present numerical embodiment, likewise the zoom optical system of Embodiment 1 in 4-lens unit configuration, the distance from the image side principal point to the exit pupil is equal to the focal length of the zoom optical system.

Moreover, in FIG. 12, theoretical values of Expression (1) is indicated with a solid line and the actual principal point interval with each focal length derived by dividing the range of the focal length equally by five is plotted with void marks. From this drawing, it is apparent that the interval between the object side principal point and the image side principal point of the zoom optical-system in the present numerical embodiment 2 is, likewise the zoom optical system of Embodiment 1 in 4-lens unit configuration, substantially equal to the values of Expression (1).

Figure 8:
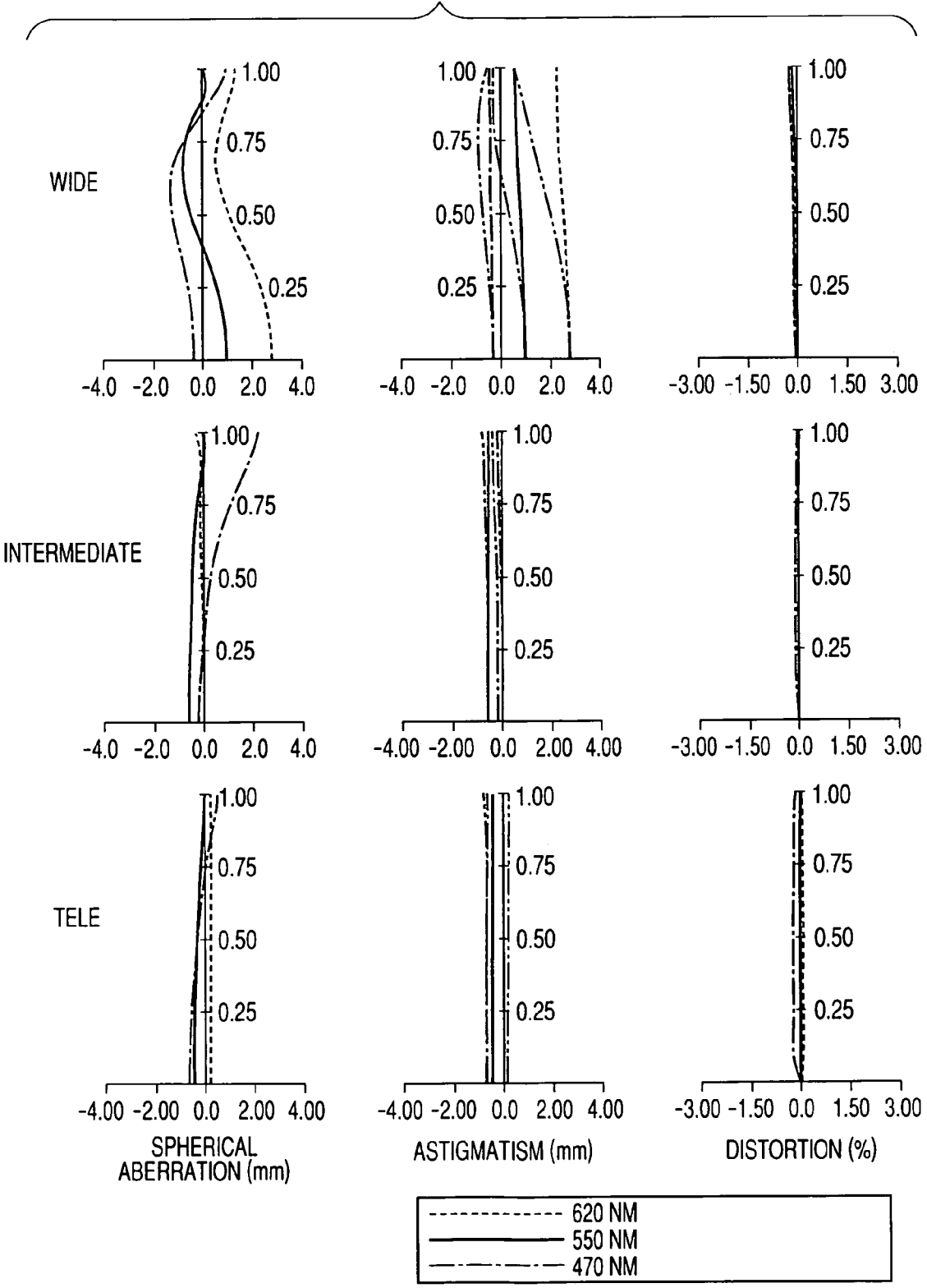
FIG. 8 is a longitudinal aberration graph of Numerical Embodiment 2 of the present invention.

In addition, longitudinal aberration graphs of the present Numerical Embodiment 2 are shown in FIG. 8. FIG. 8 shows longitudinal aberration graphs in-wide angle (74.7 mm focal length), middle (108.35 mm) and tele (142 mm focal length) in an order from the top. The wavelengths of assessment light beams are 620 nm, 550 nm and 470 nm. From this drawing, it is apparent that image forming has been implemented well.

As having been described above, each zoom optical system of the above described respective embodiments secures a sufficient space for inserting color synthesizing elements etc., is excellent in telecentricity on the object side and is excellent in the immobility of the positions of the object surface, the image plane and the exit pupil to variation of the focal length.

Accordingly, if arranging this zoom optical system on the object surface side of the projecting optical system described in Embodiment 1, a projecting optical system as well as an image projecting apparatus that is low in sensibility to manufacturing errors and has wide view angle, nevertheless can correct aberrations well and derives a large image movement quantity can be realized.

Here, in the above described Embodiments 1 and 2, a zoom optical system with the exit pupil diameter in the Y-axis direction being different from that in the X-axis direction was described, but the present invention is applicable also to a zoom optical system with the exit pupil having the same diameter in the both directions.

Here, the present invention is applicable also to a magnification length measuring machine.

In addition, in the above described embodiment, a zoom optical system with the object side being the reduction side and the image side being the magnification side was described, but the present invention is applicable also to a zoom optical system with the object side being the magnification side and the image side being the reduction side as well as an optical apparatus using this. For example, application to an exposure apparatus (if the optical system is telecentric on the reduction side, the size of an image does not vary even if a focused position of reduction-side object incurs a slight displacement) and a compact image pickup lens (having a stop on the magnification side of the zoom optical system) is feasible.

Moreover, providing a diffraction grating on the lens surface, optical power may be arranged to be derived and the chromatic aberration may be corrected.

According to the present embodiment, a zoom optical system that secures a sufficient back focus, is a bright optical system with a large numerical aperture, moreover is excellent in telecentricity on the object side and excellent in invariance of positions of the object surface, the image plane and the exit pupil to a variation of the focal length and, in addition, is compact can be realized.

This application claims priority from Japanese Patent Application No. 2004-261717 filed on Sep. 8, 2004, which is hereby incorporated by reference herein.

What is claimed is:

1. A zoom optical system, comprising in order from a reduction side to a magnification side:
   a first lens unit having a positive optical power;
   a second lens unit having a negative optical power;
   a third lens unit having a positive optical power; and
   a fourth lens unit having a positive optical power,
   wherein respective intervals between the first, second, third and fourth lens units vary during zooming,
   wherein a magnification-side conjugate position with respect to a reduction-side conjugate position and a position of a pupil of the zoom optical system with respect to the reduction-side conjugate position are substantially immobile respectively across an entire zooming range,
   wherein said pupil is located outside of the zoom optical system and is located on said magnification conjugate side of said zoom optical system, and
   wherein the fourth lens unit moves toward the magnification side and an interval between the first lens unit and the fourth lens unit increases during zooming from a wide-angle end to a telephoto end.

2. The zoom optical system according to claim 1, wherein a position of said first lens unit at a telephoto end is closer to said reduction side than a position of said first lens unit at a wide angle end is.

3. The zoom optical system according to claim 1, wherein a position of a lens unit on the most magnification side among said magnification lens units at a telephoto end is closer to a magnification side than a position of a lens unit on the most magnification side at a wide angle end is.

4. The zoom optical system according to claim 1, wherein an interval between said first lens unit and said second lens unit at a telephoto end is wider than an interval between said first lens unit and said second lens unit at a wide angle end, an interval between said second lens unit and said third lens unit at a telephoto end is narrower than an interval between said second lens unit and said third lens unit at a wide angle end and an interval between said third lens unit and said fourth lens unit at a telephoto end is wider than an interval between said third lens unit and said fourth lens unit at a wide angle end.

5. The zoom optical system according to claim 1, wherein the zoom optical system is substantially telecentric on said reduction conjugate side, and wherein across said entire zooming range, a distance from an image side principal point to said pupil is substantially equal to a focal length of the zoom optical system.

6. The zoom optical system according to claim 1, wherein across said entire zooming range, a distance from said reduction conjugate side principal point to said magnification conjugate side principal point is substantially equal to:

$$E-fz-fz(x'+fz)/x',$$

where E represents a distance from said reduction side conjugate position to said magnification side conjugate position, fz represents a focal length of the zoom optical system and x' represents a distance from said pupil to said magnification side conjugate position.

7. The zoom optical system according to claim 1, wherein across said entire zooming range, a distance from said fourth lens unit to said pupil is longer than half a minimum diameter of the pupil.

8. A projecting optical system, comprising: a zoom optical system according to claim 1, wherein a light beam from an original arranged in said reduction conjugate position is projected onto a surface to be projected.

9. A projecting optical system, comprising:
   a zoom optical system;
   a reflecting member, substantially arranged in a pupil position, for reflecting light beam from the zoom optical system; and
   a reflecting optical system including a plurality of reflecting surfaces for sequentially reflecting light beam from said reflecting member,
   wherein the zoom optical system comprises:
   a first lens unit having a positive optical power;
   a second lens unit having a negative optical power;
   a third lens unit having a positive optical power; and
   a fourth lens unit having a positive optical power,
   wherein respective intervals between the first, second, third and fourth lens units vary during zooming,
   wherein a magnification-side conjugate position with respect to a reduction-side conjugate position and said position of a pupil of the zoom optical system with respect to the reduction-side conjugate position are substantially immobile respectively across an entire zooming range,
   wherein said pupil is located outside of the zoom optical system and is located on said magnification conjugate side of said zoom optical system,
   wherein the fourth lens unit moves toward the magnification side and an interval between the first lens unit and the fourth lens unit increases during zooming from a wide-angle end to a telephoto end, wherein a light beam, which is from an original arranged in said reduction-side conjugate position and is incident to said zoom optical system, is projected onto a surface to be projected by said reflecting optical system, and wherein said reflecting member rotates so that a projected image projected onto said surface to be projected moves on said surface to be projected.

10. The projecting optical system according to claim 9, wherein said reflecting optical system includes a plurality of non-rotational symmetrical reflecting surfaces.

11. The projecting optical system according to claim 9, wherein an intermediate image of said original is formed in said reflecting optical system.

12. The projecting optical system according to claim 9, further comprising: at least one refractive optical element arranged between said reflecting optical system and said surface to be projected.

13. The projecting optical system according to claim 12, wherein said at least one refractive optical element includes a cemented lens of a positive lens and a negative lens.

14. An image projecting apparatus, comprising: a projecting optical system according to claim 9 and an image forming element of forming said original.

15. The image projecting apparatus according to claim 14, wherein across said entire zooming range, a distance from said reduction side conjugate position to said first lens unit is three times or more longer than a maximum height of said original.

16. An image projecting system, comprising: the image projecting apparatus according to claim 14 and an image information providing apparatus for supplying said image projection apparatus with image information for forming said original.

17. An optical apparatus having the zoom optical system according to claim 1.

18. An image projecting apparatus, comprising:
an image forming element for forming an original; and
a projecting optical system according to claim 8 for projecting the original onto a surface to be projected.

* * * * *